United States Patent
Hosseini et al.

(10) Patent No.: US 11,075,741 B2
(45) Date of Patent: *Jul. 27, 2021

(54) DYNAMIC TIME DIVISION DUPLEXING

(71) Applicant: QUALCOMM Incorporated, San Diego, CA (US)

(72) Inventors: Seyedkianoush Hosseini, San Diego, CA (US); Wanshi Chen, San Diego, CA (US); Peter Gaal, San Diego, CA (US); Jing Sun, San Diego, CA (US); Shimman Arvind Patel, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/555,258

(22) Filed: Aug. 29, 2019

(65) Prior Publication Data

US 2019/0386809 A1    Dec. 19, 2019

Related U.S. Application Data

(63) Continuation of application No. 15/704,733, filed on Sep. 14, 2017, now Pat. No. 10,432,387.

(Continued)

(51) Int. Cl.
*H04L 5/14* (2006.01)
*H04L 5/00* (2006.01)

(52) U.S. Cl.
CPC .......... *H04L 5/1469* (2013.01); *H04L 5/0007* (2013.01); *H04L 5/0044* (2013.01); *H04L 5/0053* (2013.01); *H04L 5/0083* (2013.01)

(58) Field of Classification Search
None
See application file for complete search history.

(56) References Cited

U.S. PATENT DOCUMENTS 10,432,387 B2 * 10/2019 Hosseini ............... H04L 5/0044
2016/0119948 A1   4/2016 Damnjanovic et al.
(Continued)

FOREIGN PATENT DOCUMENTS

CN        1905428 A       1/2007

OTHER PUBLICATIONS

International Search Report and Written Opinion—PCT/US2017/051904—ISA/EPO—Nov. 29, 2017.

*Primary Examiner* — Anh Vu H Ly
(74) *Attorney, Agent, or Firm* — Holland & Hart LLP

(57) ABSTRACT

Methods, systems, and devices for wireless communication are described. A base station may allocate resources for communication with a user equipment (UE). The resources may include one or more subframes, and each subframe may include one or more shortened transmission time intervals (sTTIs). Each sTTI may be assigned a transmission direction according to a time division duplex (TDD) pattern. Based on traffic needs and/or interference from other UEs and/or base stations, the base station may determine to modify the TDD pattern used for communication. Accordingly, a base station may transmit an indicator in a control message or control region of a TTI or sTTI, to indicate to users that a transmission direction of an sTTI in the TDD pattern is being changed. Subsequently, a user may communicate with the base station according to the reconfigured TDD pattern.

30 Claims, 23 Drawing Sheets

Related U.S. Application Data

(60) Provisional application No. 62/400,049, filed on Sep. 26, 2016.

(56) References Cited

U.S. PATENT DOCUMENTS

| | | |
|---|---|---|
| 2016/0128028 A1 | 5/2016 | Mallik et al. |
| 2016/0226650 A1 | 8/2016 | Chen et al. |
| 2016/0270059 A1 | 9/2016 | Chen et al. |
| 2016/0338046 A1* | 11/2016 | Chen .................... H04L 5/0048 |
| 2016/0360550 A1* | 12/2016 | Chen .................... H04L 5/1469 |
| 2017/0019894 A1 | 1/2017 | Nimbalker et al. |
| 2017/0215186 A1* | 7/2017 | Chen .................... H04L 27/2602 |
| 2017/0289992 A1* | 10/2017 | Sun ....................... H04L 5/0051 |
| 2018/0041325 A1 | 2/2018 | Lee et al. |
| 2018/0049175 A1 | 2/2018 | Bagheri et al. |
| 2018/0077651 A1 | 3/2018 | Nory et al. |
| 2018/0077721 A1 | 3/2018 | Nory et al. |
| 2018/0091285 A1 | 3/2018 | Hosseini et al. |
| 2018/0132132 A1 | 5/2018 | Pan et al. |
| 2018/0176043 A1 | 6/2018 | Kim et al. |
| 2018/0176909 A1 | 6/2018 | Wikstrom et al. |
| 2018/0192420 A1 | 7/2018 | Hao et al. |
| 2018/0199322 A1 | 7/2018 | Takeda et al. |
| 2018/0288762 A1* | 10/2018 | Byun .................... H04L 5/0073 |
| 2018/0359745 A1* | 12/2018 | Yeo ....................... H04W 72/14 |
| 2020/0314840 A1* | 10/2020 | Golitschek Edler Von Elbwart ............... H04L 5/0044 |

\* cited by examiner

DYNAMIC TIME DIVISION DUPLEXING

CROSS REFERENCES

The present Application for Patent is a Continuation of U.S. patent application Ser. No. 15/704,733 by Hosseini, et al., entitled, "Dynamic Time Division Duplexing" filed Sep. 14, 2017, which claims priority to U.S. Provisional Patent Application No. 62/400,049 by Hosseini, et al., entitled "Dynamic Time Division Duplexing for Low Latency Applications" filed Sep. 26, 2016, assigned to the assignee hereof.

BACKGROUND

The following relates generally to wireless communication, and more specifically to dynamic time division duplexing (TDD).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Wireless multiple-access technologies have been adopted in various telecommunication standards to provide a common protocol that enables different wireless devices to communicate on a municipal, national, regional, and even global level. An example telecommunication standard is LTE. LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

A base station may transmit to one or more UEs using a transmission time interval (TTI) that is reduced in length. Such a TTI may be referred to as a shortened TTI (sTTI) and users communicating using sTTIs may be low latency users. An sTTI may be a subset of one or more subframes that correspond to a legacy TTI. A base station may allocate transmission resources for sTTIs to a UE based on a time division duplex (TDD) pattern, where each sTTI is designated for either uplink transmissions or downlink transmissions according to the TDD pattern. However, these TDD patterns may be inadequate in light of changing traffic needs or interference from other UEs. Thus, it is desirable to support efficient techniques to dynamically allocate resources to sTTIs, for example for low latency users.

SUMMARY

A method of wireless communication is described. The method may include receiving a first control message within a first control region of a first transmission time interval (TTI) that has a first duration, receiving a second control message within a second control region of a second TTI that has a second duration that is less than the first duration, receiving, in the first control region or the second control region, a time division duplex (TDD) pattern indicator for the second TTI, and determining a TDD pattern for the second TTI based at least in part on the received TDD pattern indicator, wherein the TDD pattern changes a transmission direction for the second TTI.

Another apparatus for wireless communication is described. The apparatus may include a processor, memory in electronic communication with the processor, and instructions stored in the memory. The instructions may be operable to cause the processor to receive a first control message within a first control region of a first TTI that has a first duration, receive a second control message within a second control region of a second TTI that has a second duration that is less than the first duration, receive, in the first control region or the second control region, a TDD pattern indicator for the second TTI, and determine a TDD pattern for the second TTI based at least in part on the received TDD pattern indicator, wherein the TDD pattern changes a transmission direction for the second TTI.

A method of wireless communication is described. The method may include transmitting a first control message within a first control region of a first TTI that has a first duration, transmitting a second control message within a second control region of a second TTI that has a second duration that is less than the first duration, determining a TDD pattern for the second TTI, wherein the TDD pattern changes a transmission direction for the second TTI, and transmitting, in the first control region or the second control region, a TDD pattern indicator identifying the determined TDD pattern for the second TTI.

Another apparatus for wireless communication is described. The apparatus may include a processor, memory in electronic communication with the processor, and instructions stored in the memory. The instructions may be operable to cause the processor to transmit a first control message within a first control region of a first TTI that has a first duration, transmit a second control message within a second control region of a second TTI that has a second duration that is less than the first duration, determine a TDD pattern for the second TTI, wherein the TDD pattern changes a transmission direction for the second TTI, and transmit, in the first control region or the second control region, a TDD pattern indicator identifying the determined TDD pattern for the second TTI.

DETAILED DESCRIPTION

Resources allocated for communication may be used for uplink and downlink communication over reduced length transmission time intervals (TTIs) (e.g., shortened TTIs (sTTIs)). A wireless communication system supporting low latency communication may encounter a number of challenges, including the need to efficiently support multiple low latency users, as well as legacy users, while allowing for adaptation to data traffic needs and interference from other UEs. In some cases, resources may be allocated to a UE using a time division duplex (TDD) pattern. However, a static TDD pattern may not be adaptable to traffic needs and interference from other UEs. Accordingly, a system, which may be a low latency system in some examples, may support dynamic configuration of a TDD pattern that allows a base station and a UE to adapt to data traffic needs and interference from other UEs.

In an example, a base station may define a TDD pattern for a certain time frame (e.g., 10 ms, 20 ms, etc.), which may be a single TTI. The TDD pattern may determine the transmission direction (e.g., uplink or downlink) of symbols in the given time frame. In some cases, an sTTI may include one or more symbols within the time frame, and each sTTI may support a specific transmission direction. Additionally, guard bands may be present between certain sTTIs to support a UE switching between uplink transmission and downlink reception. Depending on traffic needs and interference from other UEs and/or base stations, a base station may reconfigure a transmission direction of an sTTI. For example, the base station may transmit control information to multiple UEs in a broadcast message or to a single UE in a unicast message indicating that the transmission direction of an sTTI is being changed. The control information may include an indication of the TDD pattern to be used for the sTTI. Depending on the change, a UE may allocate more uplink resources for transmissions to a base station or more downlink resources for reception from a base station. The frequency or periodicity of the reconfiguration may be based on a balance between signaling overhead and resource allocation flexibility.

Aspects of the disclosure introduced above are described below in the context of a wireless communications system. Resource allocation diagrams are then used to illustrate aspects of the disclosure. Aspects of the disclosure are further illustrated by and then described with reference to apparatus diagrams, system diagrams, and flowcharts that relate to dynamic TDD.

Figure 1:
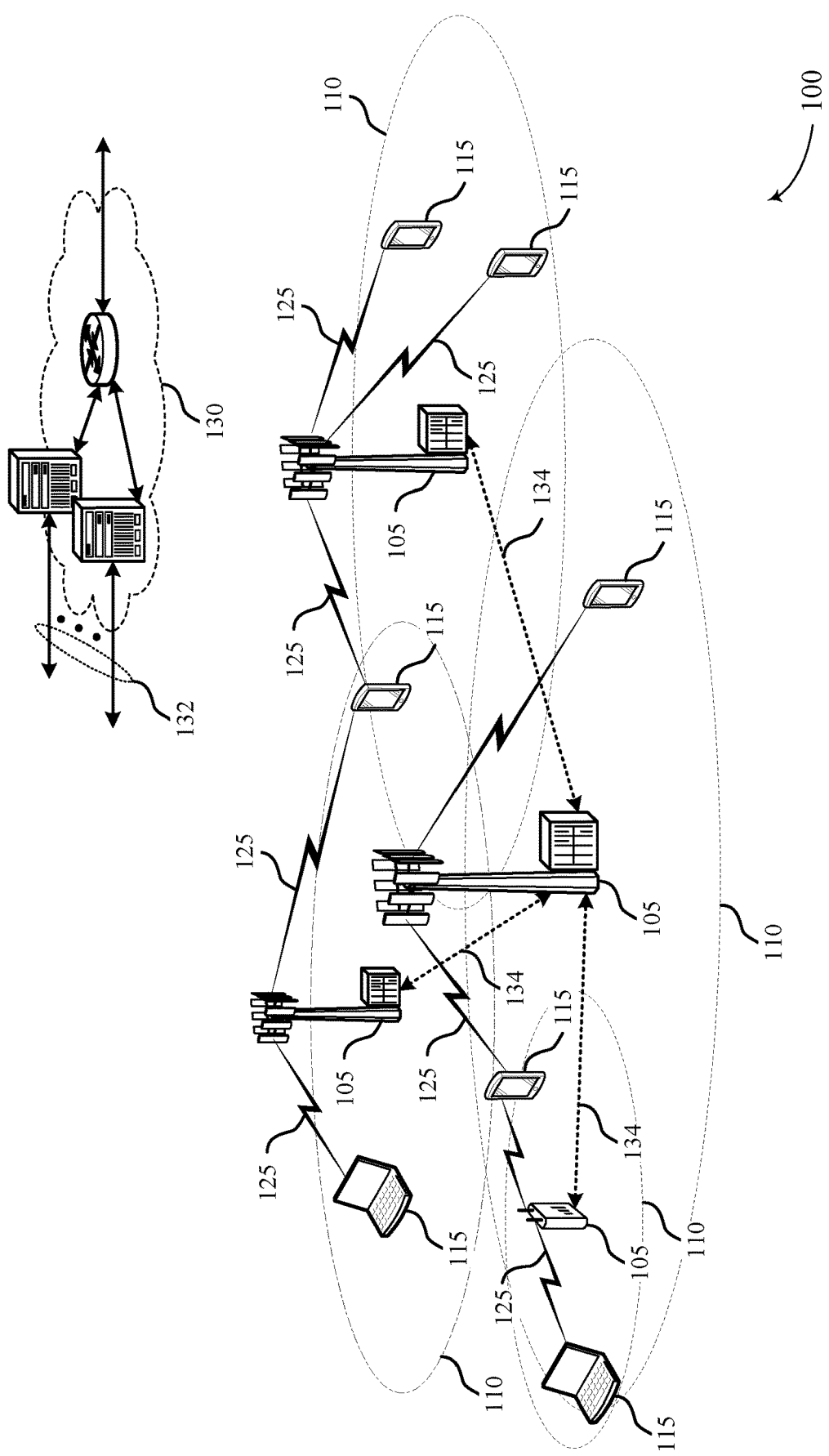
FIG. 1 illustrates an example of a wireless communication system that supports dynamic time division duplexing (TDD) in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced), or a New Radio (NR) network. In some cases, wireless communications system 100 may support enhanced broadband communications, ultra-reliable (i.e., mission critical) communications, low latency communications, and communications with low-cost and low-complexity devices, and may operate in millimeter wave (mmW) spectrum.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. In LTE/LTE-A networks, including such networks described herein, the term evolved node B (eNB) may be generally used to describe the base stations, and base stations 105 may also be referred to as eNodeBs (eNBs) 105. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, a gNB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include CDMA systems, TDMA systems, FDMA systems, and OFDMA systems. A wireless multiple-access communications system may include a number of base stations, each simultaneously supporting communication for one or more multiple communication devices, which may be otherwise known as a UE.

Wireless communications system 100 may include a radio link control (RLC) layer that connects higher layers (e.g., radio resource control (RRC) and packet data convergence protocol (PDCP)) to the lower layers (e.g., the media access control (MAC) layer). An RLC entity in a base station 105 or a UE 115 may ensure that transmission packets are organized into appropriately sized blocks (corresponding to the MAC layer transport block size). The RLC layer may also ensure that packets are reliably transmitted. The transmitter may keep a buffer of indexed RLC Protocol Data Units (PDUs), and continue retransmission of each PDU until it receives the corresponding ACK. In some cases, the transmitter may send a Poll Request to determine which PDUs have been received and the receiver may respond with a status report. Unlike the MAC layer hybrid automatic repeat request (HARQ), RLC automatic repeat request (ARQ) may not include a forward error correction (FEC) function. An RLC entity may operate in one of three modes. In acknowledged mode (AM), unacknowledged mode (UM), and transparent mode (TM). In AM, the RLC entity may perform segmentation/concatenation and ARQ. In UM, the RLC entity may perform segmentation/concatenation but not ARQ. TM only performs data buffering, and does not include either concatenation/segmentation or ARQ. TM may be used primarily for sending broadcast control information (e.g., the master information block (MIB) and system information blocks (SIBs), paging messages, and RRC connection messages.

Wireless communications system 100 may employ error correction schemes to increase the reliability of communication between a base station 105 and a UE 115. In some examples, hybrid automatic repeat request (HARQ) techniques may be used as a method of ensuring that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the media access control (MAC) layer in poor radio conditions (e.g., signal to interference plus noise (SINR) conditions). In incremental redundancy HARQ, incorrectly received data may be stored in a buffer and combined with subsequent transmission to improve the overall likelihood of successfully decoding the data. In some cases, redundancy bits are added to each message prior to transmission. This may be useful in poor conditions. In other cases, redundancy bits are not added to each transmission, but are retransmitted after the transmitter of the original message receives a negative acknowledgement (NACK) indicating a failed attempt to decode the information. The chain of transmission, response and retransmission may be referred to as a HARQ process. In some cases, a limited number of HARQ processes may be used for a given communication link 125.

In some cases, a base station 105 and a UE 115 may communicate using more than one carrier. Each aggregated carrier is referred to as a component carrier and each component can have a bandwidth of, e.g., 1.4, 3, 5, 10, 15 or 20 MHz. In some cases, the number of component carriers can be limited to, e.g., a maximum of five 20 MHz carriers, giving maximum aggregated bandwidth is 100 MHz. In frequency division duplexing (FDD), the number of aggregated carriers can be different in downlink (DL) and uplink (UL). The number of uplink component carriers may be equal to or lower than the number of downlink component carriers. The individual component carriers can also be of different bandwidths. For time division duplexing (TDD), the number of component carriers as well as the bandwidths of each component carrier will normally be the same for downlink and uplink. Component carriers may be arranged in a number of ways. For example, a carrier aggregation (CA) configuration may be based on contiguous component carriers within the same operating frequency band, e.g., called intra-band contiguous CA. Non-contiguous allocations can also be used, where the component carriers may be either be intra-band, or inter-band.

A frame structure may be used to organize physical resources in wireless communications system 100. A frame may be a 10 ms interval that may be further divided into 10 equally sized sub-frames. Each sub-frame may include two consecutive time slots. Each slot may include six (6) or seven (7) OFDMA symbol periods. A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

A resource element consists of one symbol period and one subcarrier (e.g., a 15 KHz frequency range). A resource block may contain 12 consecutive subcarriers in the frequency domain and, for a normal cyclic prefix in each OFDM symbol, seven (7) consecutive OFDM symbols in the time domain (1 slot), or 84 resource elements. Some resource elements may include one or more downlink reference signals (DL-RS), such as a cell specific reference signal (CRS) or a UE-specific reference signal (UE-RS). A demodulation or discovery reference signal (DMRS or DRS) may be examples of UE-specific reference signals. UE-RS may be transmitted on the resource blocks associated with PDSCH. The number of bits carried by each resource element may depend on the modulation scheme (the configuration of symbols that may be selected during each symbol period). Thus, the more resource blocks that a UE receives and the higher the modulation scheme, the higher the data rate may be.

A base station 105 may allocate resources to a UE 115 based on a static TDD configuration supported by wireless communications system 100. In some examples, wireless communications system 100 may support seven (7) TDD configurations, and each static TDD configuration may define a different ratio of downlink-to-uplink transmission resources in a frame, as well as the ordering of such downlink and uplink resources. Additionally, a static TDD configuration may correspond to a static HARQ configuration that determines the timing of HARQ transmissions. In some cases, a base station employing a static TDD configuration may use resources efficiently if the ratio of downlink-to-uplink transmission resources correspond to traffic needs of a UE 115 at a specific time. However, traffic needs at a UE 115 may change and static TDD configurations may not allow base station 105 to flexibly allocate resources based on traffic needs of the UEs that it serves.

As a result, wireless communications system 100 may support enhanced interference mitigation and traffic adaptation (e-IMTA) techniques. e-IMTA techniques may allow a base station to dynamically reconfigure the direction (e.g., uplink or downlink) of subframes in a TDD configuration based on traffic needs and interference with other UEs. The indication of a reconfiguration may be included in layer-1 signaling (e.g., downlink control information (DCI)). A base station 105 may use a downlink HARQ reference configuration (e.g., that may be radio resource control (RRC) configured) and an uplink HARQ reference configuration (e.g., that may be system information block 1 (SIB1) configured) to schedule HARQ transmissions in a system employing e-IMTA. The periodicity of the reconfiguration may be 10 ms, 20 ms, 40 ms, 80 ms, etc., and the periodicity may be determined based on a balance between flexible resource allocation and signaling overhead.

A wireless communications system 100 may also support low latency communication between a base station and one or more UEs 115 using, for example, shortened transmission time intervals (sTTIs). By using sTTIs, a base station may allocate a smaller set of resources to UEs 115 and, as a result, a base station may have more flexibility to communicate with multiple UEs 115. In some examples, an sTTI may be a slot in a subframe, or an sTTI may be one or more symbols in a subframe. In some cases, data traffic needs of a base station 105 or a UE 115 may change and the amount of interference received by a UE 115 may vary over time. Therefore, it may be appropriate to support e-IMTA techniques in low latency communication to allocate resources based on traffic needs, channel conditions, interference conditions, etc. However, the periodicity of dynamic reconfiguration for e-IMTA described above may not apply to low latency systems since the TTIs are shortened. Additionally, the HARQ timing used for the HARQ reference configurations described above may not be efficient for sTTI allocations.

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Accordingly, wireless communications system 100 may support techniques for dynamic configuration of sTTIs using appropriate reconfiguration periodicities and HARQ processes. In one example, a base station 105 may define a default TDD configuration for a given time frame (e.g., 10 ms, 20 ms, etc.). The base station 105 may determine the periodicity of a reconfiguration procedure based on a balance between signaling overhead and resource allocation flexibility. The base station 105 may reconfigure the transmission direction (e.g., uplink or downlink) of sTTIs in the default TDD configuration using additional control signaling (e.g., by providing an indication of the TDD pattern to be used for the sTTI in a broadcast message, a grant, etc.). Alternatively, base station 105 may use self-contained sTTIs (e.g., self-contained slots) for communication with a UE 115. The self-contained sTTIs may allow for flexible TDD configurations and may be backwards compatible with resource allocations in legacy subframes.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-Advanced (LTE-A) are releases of UMTS that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned in this disclosure as well as other systems and radio technologies. While aspects of an LTE system may be described for purposes of example, and LTE terminology may be used in much of the description, the techniques described herein are applicable beyond LTE applications.

Figure 2:
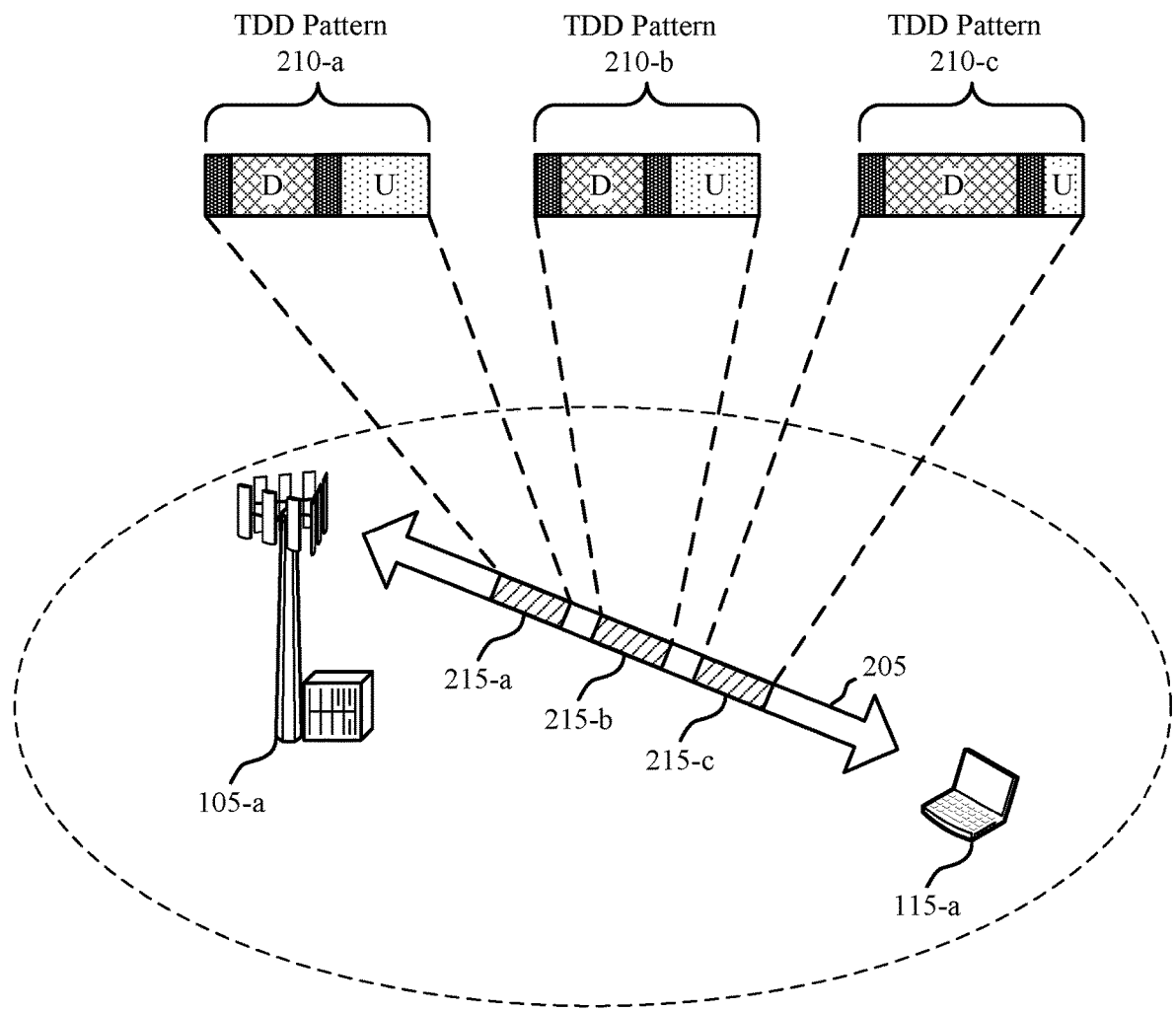
FIG. 2 illustrates an example of a wireless communication system that supports dynamic TDD in accordance with aspects of the present disclosure.

FIG. 2 illustrates an example of a wireless communications system 200 for dynamic TDD. Wireless communications system 200 includes base station 105-a and UE 115-a, which may be examples of aspects of a UE 115 as described above with reference to FIG. 1. Base station 105-a may communicate with UE 115-a over carrier 205. In some examples, base station 105-a may allocate resources for communication with legacy UEs over carrier 205. For example, base station 105-a may allocate subframes 215, including for example subframe 215-a, subframe 215-b, and subframe 215-c, for communication with legacy UEs. Each subframe 215 of the subframes 215 may be assigned a transmission direction (e.g., uplink or downlink) based on a legacy TDD pattern or configuration, and one or more subframes 215 may correspond to a legacy TTI. A legacy TDD pattern or configuration may include uplink subframes used for uplink transmissions, downlink subframes used for downlink transmissions, special subframes used for transitioning between uplink and downlink, and flexible subframes for either uplink and/or downlink transmissions. A legacy TDD pattern or configuration may be dynamically configurable using RRC signaling or control messages (e.g., DCI). Subframes 215 may also include one or more sTTIs, and base station 105-a may allocate sTTIs communication with UE 115-a (e.g., for low latency communication).

In this example, subframes 215 may include TDD patterns 210 which may include downlink sTTIs 220, uplink sTTIs 225, and guard periods 230. The guard periods may allow time for the base station 105-a or the UE 115-a to switch from a downlink mode of operation to an uplink mode of operation, or vice versa. A TDD pattern may define the transmission direction of sTTIs in a resource allocation. TDD pattern 210-a and TDD pattern 210-b may be default TDD patterns (e.g., configured using RRC signaling) deployed in subframes 215-a and 215-b, and TDD pattern 210-c may be an example of a reconfigured TDD pattern, deployed in subframe 215-c. Additionally or alternatively, each of subframe 215-a, subframe 215-b, and subframe 215-c of the subframes 215 may include two (2) slots, and each slot (e.g., a self-contained slot) may include symbols with designated transmission directions (e.g., uplink or downlink). In some examples, a TDD pattern 210 may span the width of a single slot of a subframe 215. In other examples, the TDD patterns 210 may have different widths (e.g., span a different number of one or more symbols of a subframe 215). A self-contained slot may provide uplink resource allocations for uplink data and control signals, downlink resource allocations for downlink data and control, or any combination of uplink and downlink resource allocations. A self-contained slot may or may not include guard periods depending on the structure of the self-contained slot and adjacent slots (e.g., pure downlink or pure uplink). For example, where the self-contained slot ends with a downlink transmission direction, a guard period may not be needed where a subsequent and adjacent self-contained slot begins with a downlink transmission direction.

In one example, base station 105-*a* and UE 115-*a* may be configured to communicate using the default TDD pattern (e.g., TDD Pattern 210-*a* or TDD Pattern 210-*b*) for a predetermined time frame (e.g., a predetermined number of sTTIs). In some examples, a base station 105-*a* may evaluate the uplink data traffic across carrier 205 and the downlink data traffic across carrier 205. Base station 105-*a* may determine that the amount of data transferred on the uplink is substantially less than the amount of data transferred on the downlink. Additionally or alternatively, base station 105-*a* may determine that the rate of successful uplink transmissions on carrier 205 is low due to interference from other UEs 115. Accordingly, base station 105-*a* may determine to reconfigure the TDD pattern used for communication with UE 115-*a*. For instance, base station 105-*a* may transmit an indicator that reconfigures the transmission direction of one or more sTTIs in a subframe 215 (e.g., subframe 215-*c* with TDD Pattern 210-*c*). The transmission direction of one or more uplink sTTIs may be reconfigured from uplink to downlink, and the base station 105-*a* may have access to more resources for downlink communication with UE 115-*a*. In some cases, the base station 105-*a* may include the indicator in a grant such as a stage 0 grant in a physical downlink control channel (PDCCH) of a subframe 215 (e.g., subframe 215-*a* or subframe 215-*b*) or a stage 1 grant of an sTTI in the first slot of subframe 215-*c*. Additionally or alternatively, the base station 105-*a* may include the grant in a common search space (CSS) of a control region, and UE 115-*a* may monitor the common search space to receive the indicator.

In another example, base station 105-*a* and UE 115-*a* may communicate using self-contained slots. The self-contained slots may include symbols, and each symbol may be assigned a transmission direction independent of the transmission direction of the corresponding subframe that contains the self-contained slot. In some examples, the TDD pattern of a self-contained slot may be based on predetermined configurations and, in other examples, the TDD pattern may be flexible. As described above, the base station 105-*a* may evaluate traffic conditions and interference conditions across carrier 205. Based on the evaluation, the base station 105-*a* may determine to reconfigure self-contained slots included in subsequent subframes 215 (e.g., subframe 215-*c*) to support more downlink resource allocations and fewer uplink resource allocations. If the TDD pattern of self-contained slots in subframe 215-*c* are flexible, base station 105-*a* may reconfigure the transmission direction of sTTIs in the self-contained slots in subframe 215-*c* to correspond to TDD pattern 210-*c*. If the TDD pattern of the self-contained shot is selected from one or more predetermined configurations, base station 105-*a* may select a self-contained slot configuration corresponding to TDD pattern 210-*c* for subsequent communication with UE 115-*a*.

The TDD pattern of a self-contained slot used for communication between base station 105-*a* and UE 115-*a* may be backwards compatible with legacy techniques. In some examples, the self-contained slot may be used for low latency communications. In some cases, the TDD pattern of a self-contained slot may depend on the transmission direction of a legacy subframe that contains the self-contained slot. For example, if one or more symbols are used for a PDCCH transmission, the transmission direction of these symbols may not be reconfigured. In some cases, the PDCCH symbols may serve as a guard period for the transition between uplink and downlink operation. Additionally, if one or more symbols are used for transmission of a CRS, DMRS, or DRS, the transmission direction (e.g., downlink) of these symbols may not be reconfigured. For example, if legacy users are scheduled to communicate using DMRS-dependent transmission modes, the last two symbols of each slot (e.g., symbols 5 and 6) may be assigned as downlink symbols.

Accordingly, a base station may use a TDD pattern that assigns a downlink transmission direction to the last two (2) symbols of each slot. Alternatively, different DMRS patterns may be used for legacy transmissions (e.g., symbols 2 and 3), and base station 105-*a* may transmit information about the different DMRS patterns to legacy users. As a result, the last two (2) symbols of each slot may be used for uplink transmissions. If a subframe is configured as a multicast broadcast single-frequency network (MBSFN) subframe, the TDD pattern of a self-contained slot may be flexible, since reference signals (e.g., CRS and DMRS) may not be used in MBSFN subframes.

Figure 3:
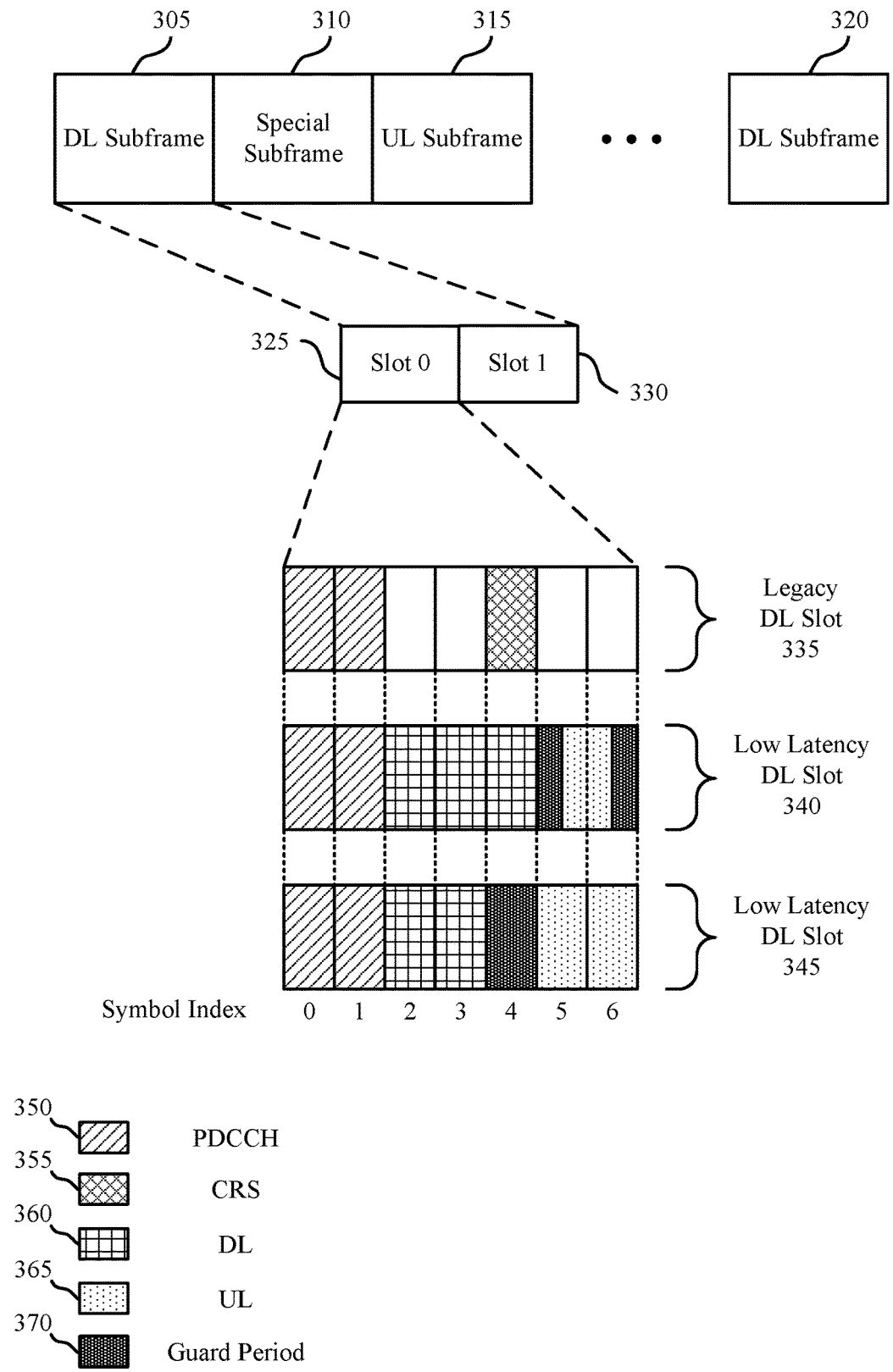
FIGS. 3-5 illustrates examples of resource allocation diagrams that support dynamic TDD in accordance with aspects of the present disclosure.

FIG. 3 illustrates an example of a resource allocation diagram 300 for dynamic TDD. A base station may allocate resources for communications with legacy UEs according to a TDD configuration. A subframe 305 may have resources allocated to downlink communication, a subframe 310 may be a special subframe (e.g., for switching between downlink and uplink), with some resources allocated to downlink communications and some resources allocated to uplink communications. A subframe 315 may contain resources allocated for uplink communication, and a subframe 320 may have resources allocated for downlink communication. A base station may also allocate resources for communication with low latency UEs (e.g., sTTIs). Subframe 305 may include two slots: slot 325 and slot 330. Slot 325 may be an example of a self-contained slot described with reference to FIG. 2. In some examples slot 325 may include sTTIs allocated for low latency communication. The TDD configuration (or TDD pattern) of a self-contained slot (e.g., slot 325), or a portion of the self-contained slot, may vary based on traffic needs and interference in a low latency system.

In some examples, slot 325 may correspond to legacy downlink slot 335 and may include PDCCH transmissions 350 on symbols 0 and 1 (e.g., corresponding to symbol index 0 and 1) and a CRS transmission 355 on symbol 4. In some cases, a low latency user may monitor the PDCCH transmissions 350 for an indication of a reconfiguration of the transmission direction of sTTIs in slot 325 and, in some examples, for subsequent slots as described above with reference to FIG. 2. Alternatively, a low latency user may monitor downlink symbol 2 for an indication of a reconfiguration of the transmission direction of sTTIs in slot 325 and, in some examples, for subsequent slots as described above with reference to FIG. 2. For example, the PDCCH transmission 350 may include a grant of resources indicating the presence of an sTTI at least at symbol 2. The low latency user may then monitor for the indication of the reconfiguration of the transmission direction in a grant found in a control region of the sTTI at symbol 2. The number of symbols used for PDCCH transmissions 350 may depend on the bandwidth used for the PDCCH transmissions 350 (e.g., 2 symbols for higher bandwidth applications, or 3 or 4 symbols for lower bandwidth applications).

In a first example, slot 325 may correspond to a low latency downlink slot 340 that includes a downlink resource allocation 360 and uplink resource allocation 365. A base station and a UE may use the downlink and uplink resource allocations to transmit and receive data and control signals. An sTTI may be one (1) symbol and the ratio of uplink sTTIs to downlink sTTIs may be 1:4. Therefore, the TDD pattern of low latency downlink slot 340 may support downlink heavy communication between a base station and a low latency user. Since symbol 4 is assigned as a downlink symbol in the low latency system, the low latency system may avoid interfering with the legacy system and the CRS may be successfully transmitted. Low latency downlink slot 340 may include guard periods 370 that may allow a base station or UE, time to transition from a downlink operation mode to an uplink operation mode (e.g., within the slot or across adjacent slots). In low latency downlink slot 340, the guard periods may not span a whole symbol period but may span a portion of one or more symbol periods (e.g., a first portion of symbol 5 and a second portion of symbol 6).

In a second example, slot 325 may correspond to low latency downlink slot 345 that also includes downlink resource allocation 360 and uplink resource allocation 365. A base station and a UE may use the downlink and uplink resource allocations to transmit and receive data and control signals. In some cases, an sTTI may be one (1) symbol and the ratio of uplink sTTIs to downlink sTTIs may be 1:1. In other cases, an sTTI may be two (2) symbols and the ratio of uplink sTTIs to downlink sTTIs may also be 1:1. Therefore, the TDD pattern of low latency downlink slot 345 may support the same amount of resources for uplink and downlink communication between a base station and a low latency user.

Low latency downlink slot 345 may include a guard period 370 that allows a base station or UE, time to transition from downlink operation to uplink operation. In this example, the guard period may align with a symbol period (e.g., symbol 4) which may be used for CRS transmissions 355. Since symbol 4 is used as a guard period, a low latency system user may skip monitoring the symbol. Accordingly, the low latency system may avoid interfering with the legacy system and the CRS may be successfully transmitted. However, in some cases, it may be appropriate for a low latency user to monitor symbol 4 for the CRS transmission 355 to perform a channel estimation procedure. Therefore, in another example, symbol 4 may be assigned as a downlink symbol, and the guard period may span symbol 5. Since the last symbol in low latency downlink slot 345 is assigned as an uplink symbol, a base station may assign the first symbol of slot 330 as a guard period before switching to downlink operation. However, this may decrease efficiency since fewer symbol periods may be available for communication in slot 330.

Figure 4:
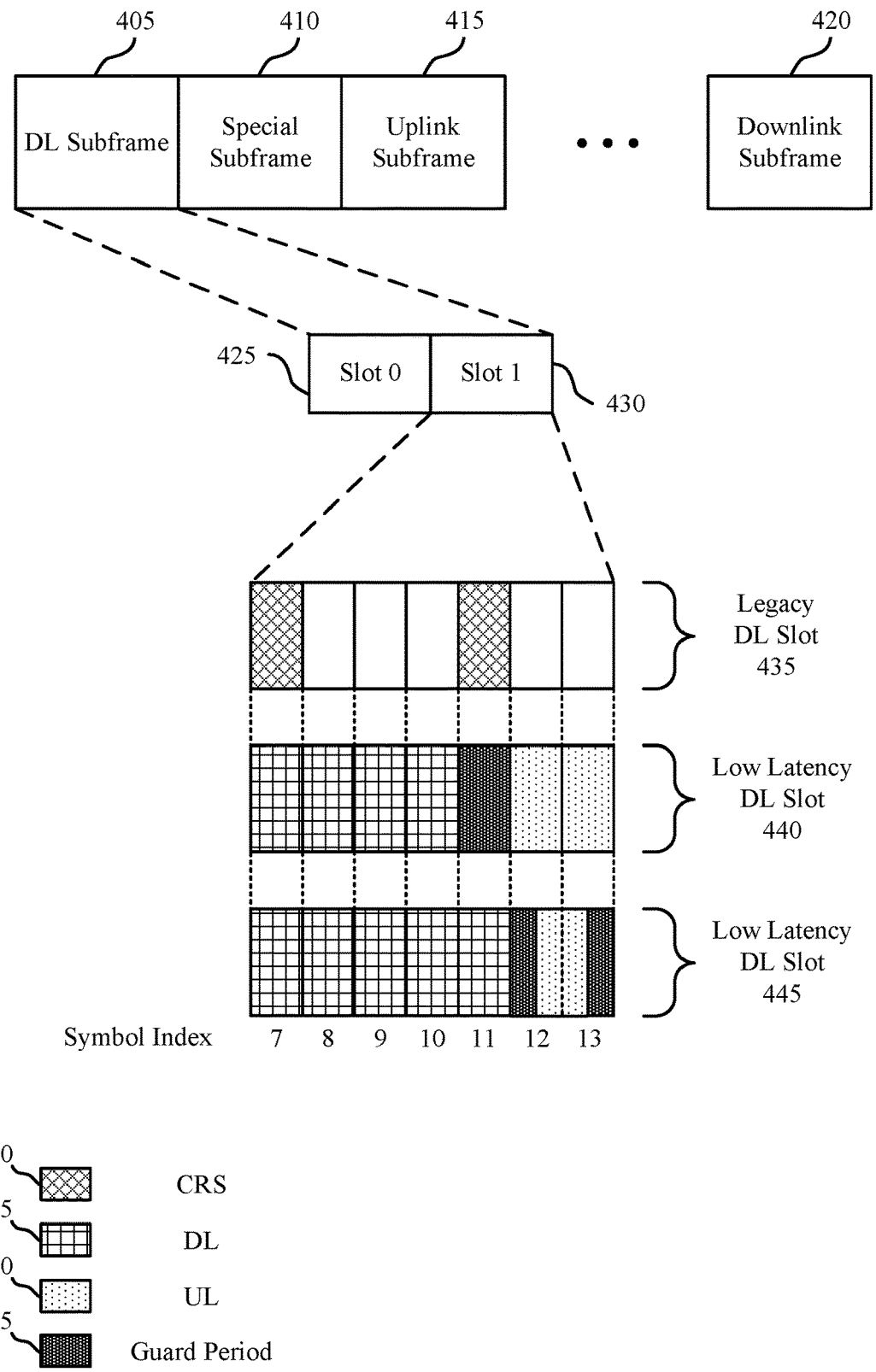

FIG. 4 illustrates an example of a resource allocation diagram 400 for dynamic TDD. A base station may allocate resources for communication with legacy UEs according to a TDD configuration. A subframe 405 may have resources allocated to downlink communication, a subframe 410 may be a special subframe (e.g., for switching between downlink and uplink) with some resources allocated to downlink communications and some resources allocated to uplink communications, a subframe 415 may contain resources allocated for uplink communication, and a subframe 420 may be allocated for downlink communication.

A base station may also allocate resources for communication with low latency UEs (e.g., sTTIs). Subframe 405 may include slot 425 and slot 430. Slot 430 may be an example of a self-contained slot described with reference to FIG. 2. In some examples, slot 430 may include sTTIs allocated for low latency communication. The TDD configuration (or TDD pattern) of a self-contained slot (e.g., slot 425) may vary based on traffic needs and interference in a low latency system. In this example, slot 430 may correspond to legacy downlink slot 435 and may include CRS transmissions 450 on symbol 1 and symbol 4. In some cases, a low latency user may monitor downlink symbol 1 for an indication of a reconfiguration of the transmission direction of sTTIs in slot 430 and, in some examples, for subsequent slots as described above with reference to FIG. 2.

In a first example, slot 430 may correspond to a low latency downlink slot 440 that includes downlink resource allocations 455 and uplink resource allocations 460. A base station and a UE may use the downlink and uplink resource allocations to transmit and receive data and control signals. An sTTI may be one (1) symbol and the ratio of uplink sTTIs to downlink sTTIs may be 1:2. Alternatively, an sTTI may be two (2) symbols and the ratio of uplink sTTIs to downlink sTTIs may also be 1:2. Therefore, the TDD pattern of low latency downlink slot 440 may support downlink heavy communication between a base station and a low latency user.

Since symbol 7 of low latency downlink slot 440 is assigned as a downlink symbol in the low latency system, the low latency system may avoid interfering with the legacy system and the CRS may be successfully transmitted. Additionally, since symbol 11 is assigned as a guard period, a low latency user may skip monitoring this symbol and the low latency system may avoid interfering with the legacy system. Low latency downlink slot 440 may include a guard period 465 that allows a base station or UE time to transition from downlink operation to uplink operation. In this example, symbol 6 of slot 425 may be assigned as a guard period to transition from uplink operation to downlink operation. In another example, symbol 7 of slot 430 may be assigned as a guard period to allow a base station or UE to transition from uplink operation to downlink operation. In low latency downlink slot 440, the guard period may align with a symbol period (e.g., symbol 11).

In a second example, slot 430 may correspond to low latency downlink slot 445 that also includes downlink resource allocations 455 and uplink resource allocations 460. A base station and a UE may use the downlink and uplink resource allocations to transmit and receive data and control signals. In some cases, an sTTI may be one (1) symbol and the ratio of uplink sTTIs to downlink sTTIs may be 1:5. Therefore, the TDD pattern of low latency downlink slot 445 may support downlink heavy (e.g., where downlink channel has a higher load than an uplink channel, such as where the downlink channel has a load that is more than twice or three times the load of the uplink channel, the threshold for which may be configured) communication between a base station and a low latency user. Low latency downlink slot 445 may include guard periods 465 that may allow a base station or UE time to transition from a downlink operation mode to an uplink operation mode (e.g., within the slot or across adjacent slots). In low latency downlink slot 445, the guard periods may not span a whole symbol period but may span a portion of one or more symbol periods (e.g., first portion of symbol 12 and second portion of symbol 13).

In another example, the first guard period may span a first portion of symbol 11 and more resources may be available for uplink transmissions.

Figure 5:
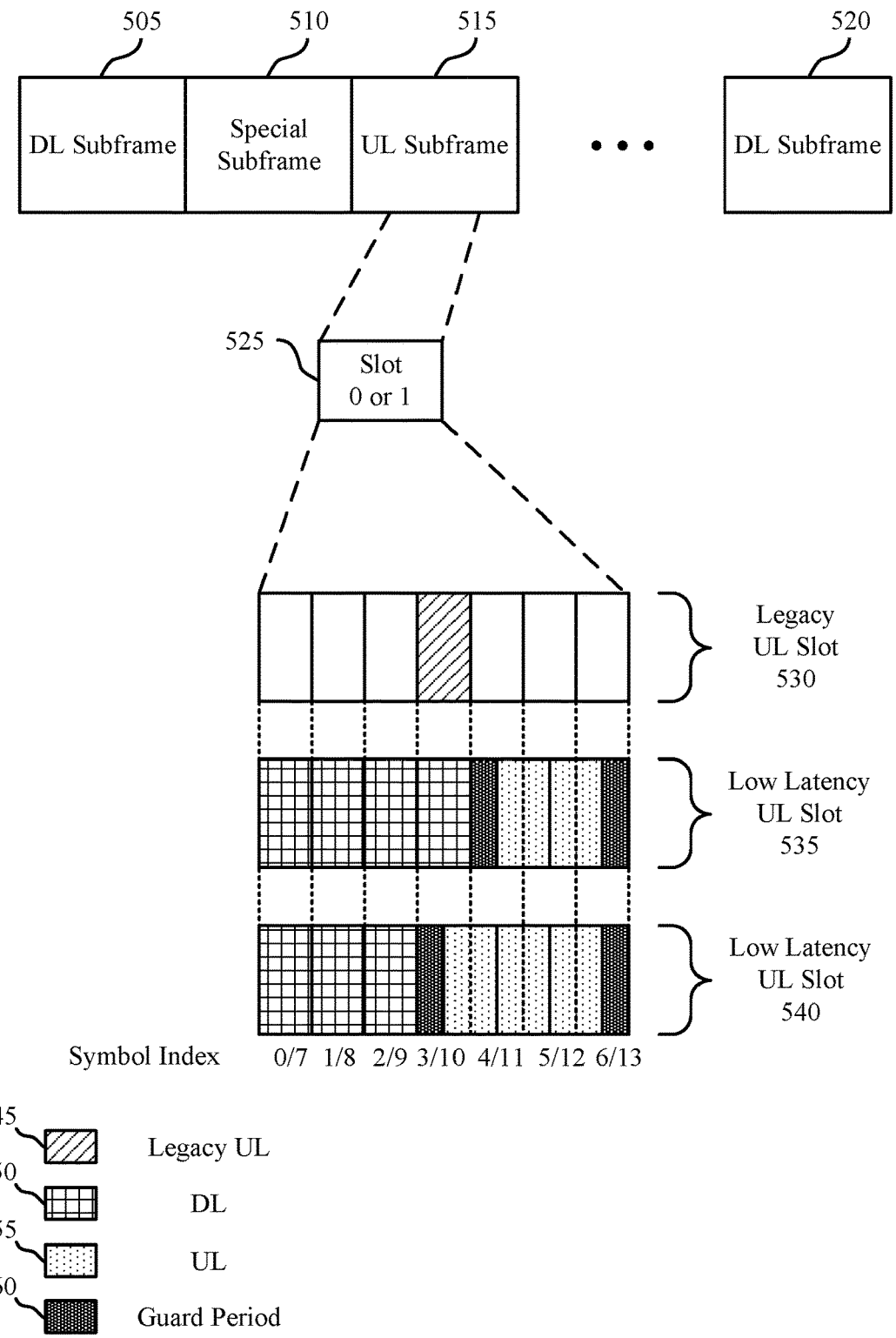

FIG. 5 illustrates an example of a resource allocation diagram 500 for dynamic TDD. A base station may allocate resources for communication with legacy UEs according to a TDD configuration. A subframe 505 may have resources allocated to downlink communication, a subframe 510 may be a special subframe (e.g., for switching between downlink and uplink) with some resources allocated to downlink communications and some resources allocated to uplink communications, a subframe 515 may contain resources allocated for uplink communication, and a subframe 520 may have resources allocated for downlink communication.

A base station may also allocate resources for communication with low latency UEs (e.g., sTTIs). Subframe 515 may include slot 525, which may be a first slot or second slot of subframe 515. Slot 525 may be an example of a self-contained slot described with reference to FIG. 2. In some examples, slot 252 may include sTTIs allocated for low latency communication. The TDD configuration (or TDD pattern) of a self-contained slot (e.g., slot 525) may vary based on traffic needs and interference in a low latency system. In this example, slot 525 may support flexible allocation of sTTIs in slot 525 since legacy PDCCH and reference signals may not be transmitted on subframe 515. In some cases, a legacy user may be scheduled for a legacy uplink transmission 545 on the fourth symbol of the slot.

In a first example, slot 525 may correspond to a low latency uplink slot 535 that includes downlink resource allocations 550 and uplink resource allocations 555. A base station and a UE may use the downlink and uplink resource allocations to transmit and receive data and control signals. An sTTI may be one (1) symbol and the ratio of uplink sTTIs to downlink sTTIs may be 1:2. Alternatively, an sTTI may be two (2) symbols and the ratio of uplink sTTIs to downlink sTTIs may also be 1:2. Therefore, the TDD pattern of low latency uplink slot 535 may support downlink heavy communication between a base station and a low latency user.

In some cases, a base station may allocate the first four symbols of low latency uplink slot 535 as uplink symbols for communication with a low latency user. In an example, the base station may indicate to the legacy user scheduled on the fourth symbol that the fourth symbol is unavailable for legacy transmissions. Accordingly, the low latency system may avoid interfering transmissions with the legacy system. Low latency uplink slot 535 may include guard periods 560 that may allow a base station or UE time to transition from a downlink operation mode to an uplink operation mode (e.g., within the slot or across adjacent slots). In low latency uplink slot 535, the guard periods may not span a whole symbol period but may span a portion of one or more symbol periods (e.g., first portion of the fifth symbol and second portion of the seventh symbol). The position and duration of a guard period may depend on a TDD configuration and uplink and downlink traffic needs.

In a second example, slot 525 may correspond to low latency uplink slot 540 that also includes downlink resource allocations 550 and uplink resource allocations 555. A base station and a UE may use the downlink and uplink resource allocations to transmit and receive data and control signals. In some cases, an sTTI may be one (1) symbol and the ratio of uplink sTTIs to downlink sTTIs may be 1:1. In other cases, an sTTI may be three (3) symbols and the ratio of uplink sTTIs to downlink sTTIs may be 1:1. In both cases, the TDD pattern of low latency uplink slot 540 may support substantially the same amount of resources for uplink and downlink transmissions. Low latency uplink slot 540 may include guard periods 560 that may allow a base station or UE time to transition from a downlink operation mode to an uplink operation mode (e.g., within the slot or across adjacent slots). In low latency uplink slot 540, the guard periods may not span a whole symbol period but may span a portion of one or more symbol periods (e.g., first portion of the fourth symbol and second portion of a seventh symbol).

Figure 6:
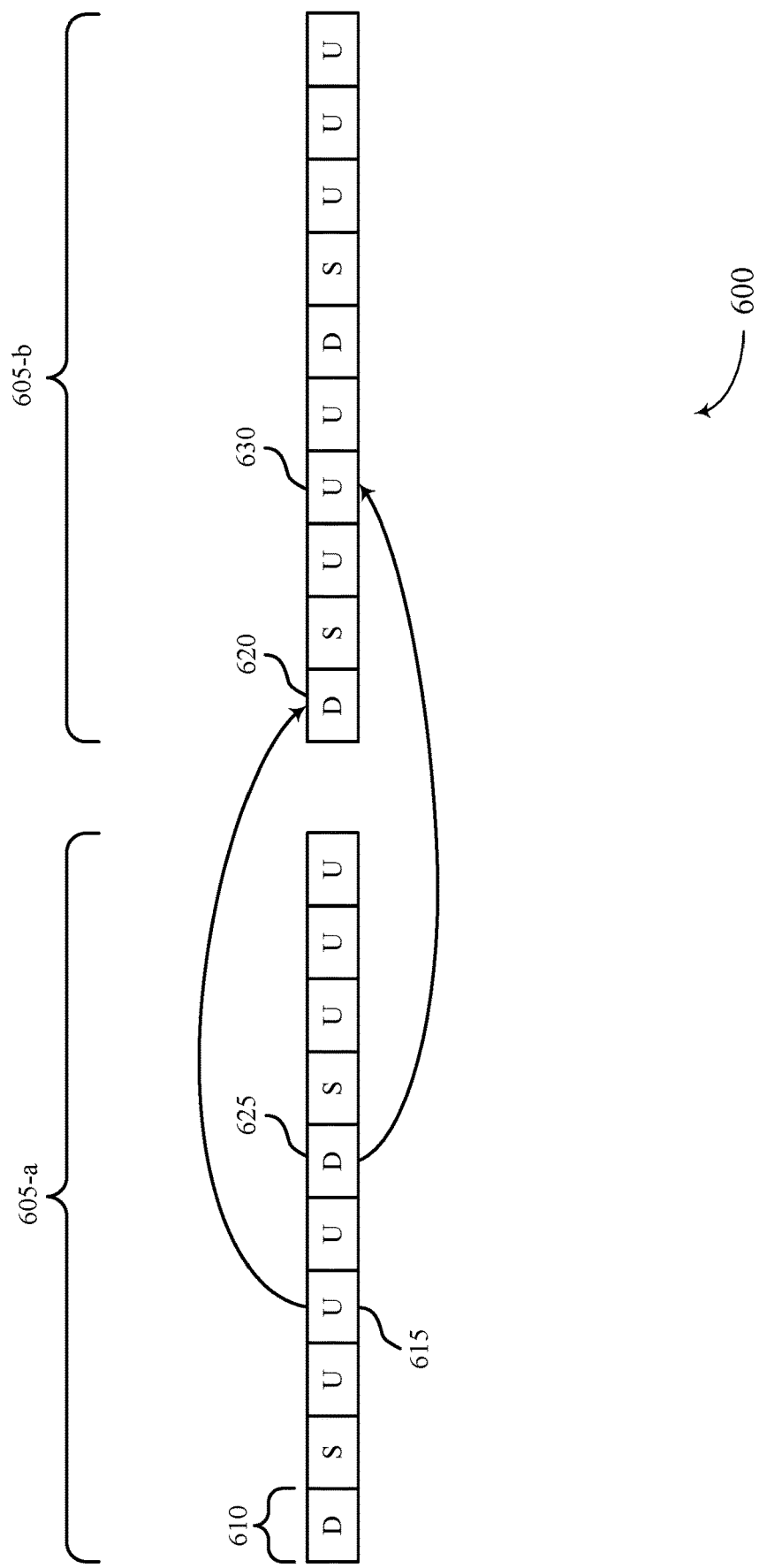
FIG. 6 illustrates an example of HARQ signaling in a system that supports dynamic TDD in accordance with aspects of the present disclosure.

FIG. 6 illustrates an example of HARQ signaling 600 for dynamic TDD. A base station may allocate resources for communication with legacy UEs, and/or a base station may allocate resources for communication with low latency users. Time period 605-a and time period 605-b may represent a group of resources in the time domain. For example, time periods 605-a and 605-b may be examples of frames in a legacy LTE system, and time period 610 may correspond to a subframe in a legacy LTE system. Alternatively, time period 610 may correspond to an sTTI and time periods 605 may correspond to a predetermined number of sTTIs. In some cases, an uplink transmission over time period 615 may or may not be received by a base station. Depending on whether the transmission was successful, a base station may transmit an ACK or NACK in a HARQ message over time period 620 to indicate successful or unsuccessful reception of the transmission. Similarly, a downlink transmission over time period 625 may or may not be received by a UE. Depending on whether the transmission was successful, a UE may transmit an ACK or NACK in a HARQ message over time period 630 to indicate successful or unsuccessful reception of the transmission.

In a first example, a time period 605 may be an example of a frame and time period 610 may be an example of a subframe. A base station may assign different transmission directions (e.g., uplink or downlink) to different subframes based on a TDD configuration (or TDD pattern). The TDD configuration may be a downlink HARQ reference configuration where uplink subframes are treated as anchor subframes and may not be reconfigured, or the TDD configuration may be an uplink HARQ reference configuration where downlink subframes are treated as anchor subframes and may not be reconfigured. These HARQ reference configurations may be used to ensure that resources are available for HARQ transmissions in a time period 605.

A low latency user may transmit an uplink message over time period 615 and receive a HARQ message over time period 620 in response to the transmission seven (7) subframes later based on an uplink HARQ reference configuration. Similarly, a base station may transmit a downlink message over time period 625 and receive a HARQ message over time period 630 in response to the transmission eight (8) subframes later. In some cases, the HARQ reference configurations may be reliable since anchor subframes may not be reconfigured and are thus available for HARQ transmissions at all times. However, for low latency applications, the HARQ delay may be large.

In a second example, time period 610 may be an example of an sTTI and time period 605 may be an example of a predetermined number of sTTIs. A base station may assign different transmission directions to different sTTIs based on a TDD configuration (or TDD pattern). An sTTI may correspond to, for example, one (1) symbol, two (2) symbols, or one (1) slot of a legacy subframe, and communication using sTTIs may be backwards compatible with legacy systems. The TDD configuration may be a downlink HARQ reference configuration where uplink sTTIs in a subframe are treated as anchor sTTIs, or the TDD configuration may be an uplink HARQ reference configuration where downlink sTTIs are treated as anchor sTTIs. A low latency user may transmit an uplink message over time period 615 and receive a HARQ message over time period 620 in response to the transmission seven (7) symbols later based on an uplink HARQ reference configuration. Similarly, a base station may transmit a downlink message during time period 625 and receive a HARQ message during time period 630 in response to the transmission eight (8) symbols later. As described above, the HARQ reference configurations may be reliable since anchor sTTIs may not be reconfigured and are thus available for HARQ transmissions at all times. Additionally, since the HARQ reference configurations are scaled based on the length of an sTTI, the HARQ delay may not be large.

In a third example, time period 610 may be an example of an sTTI and time period 605 may be an example of a predetermined number of sTTIs. A base station may assign different transmission directions to different sTTIs based on a TDD configuration (or TDD pattern). An sTTI may correspond to one (1) symbol, two (2) symbols, or one (1) slot and communication using sTTIs may be backwards compatible with legacy systems. In some cases, a low latency user may receive an indication of a value $k_1$, $k_2$, or both, (e.g., in a grant) associated with HARQ timing for uplink and downlink transmissions in specific sTTIs. For example, a low latency user may transmit an uplink message over time period 615. The low latency user may then identify the values $k_1$, $k_2$, or both, included in the grant and determine the timing of a HARQ process based on the following equation:

$$HARQ\ sTTI = n + (k_1 * sTTI) + k_2 \quad (1)$$

where n represents an index corresponding to the current sTTI, sTTI represents the length of the sTTI, and $k_1$ and $k_2$ are values associated with the HARQ timing.

For example, for the uplink transmission over time period 615, low latency user may receive the indication of the values of $k_1$ and $k_2$ (for example, where $k_1=4$ and $k_2=3$) in a grant prior to the transmission, and the low latency user may determine that the HARQ message for this transmission is sent over time period 620. Similarly, a base station 105 may transmit a downlink message over time period 625 and transmit an indication of a value of $k_2$ (e.g., where $k_2=4$) to a low latency user, while the value of $k_1$ may remain unchanged (e.g., $k_1=4$. The low latency user may then transmit a HARQ message over time period 630 based on the value of $k_1$, $k_2$ and equation 1. The values of $k_1$ and $k_2$ may depend on the TDD pattern, an interference pattern, downlink and uplink processing time, or the like. In some cases, the transmission direction of an sTTI allocated for HARQ transmission based on the value of $k_1$, $k_2$, or both, may change in the time between the grant and the HARQ transmission. In such cases, a base station may indicate the direction change to low latency users and update the value of $k_1$, $k_2$, or both, for a HARQ transmission in a subsequent grant.

In a fourth example, time period 610 may be an example of an sTTI and time period 605 may be an example of a predetermined number of sTTIs. A TDD configuration (or TDD pattern) of a self-contained slot including the sTTIs may be one of a predefined number of TDD configurations. In such cases, HARQ association tables may be defined to determine the HARQ timing used for transmissions in specific TDD configurations. For example, when a low latency user is communicating using the TDD configuration corresponding to time periods 605, the low latency user may determine that an uplink transmission over time period 615 corresponds to a HARQ message over time period 620 and that a downlink transmission over time period 625 corresponds to a HARQ message over time period 630.

Figure 7:
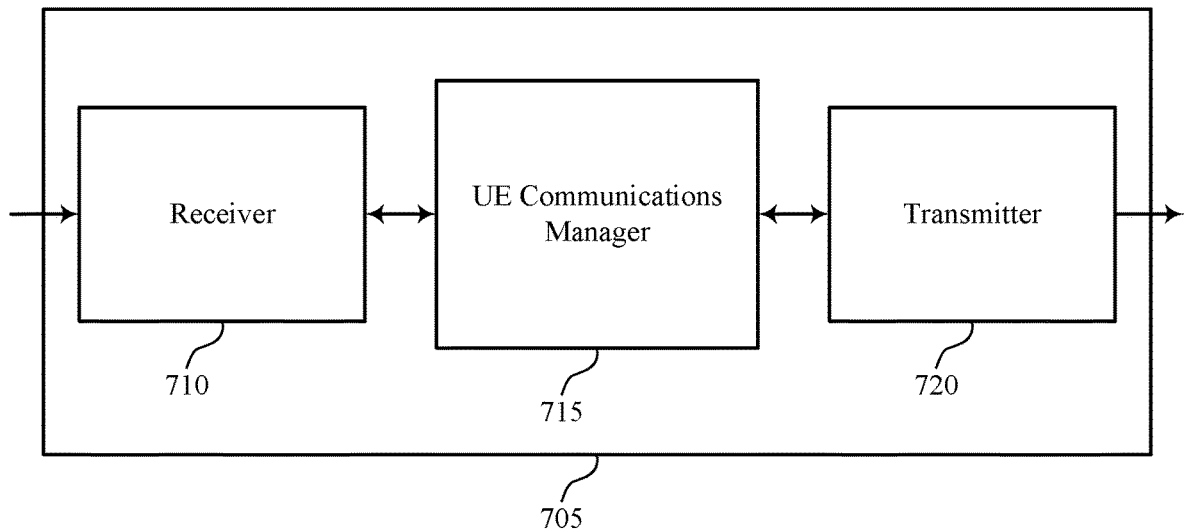
FIGS. 7 through 9 show block diagrams of a device that supports dynamic TDD in accordance with aspects of the present disclosure.

FIG. 7 shows a block diagram 700 of a wireless device 705 that supports dynamic TDD in accordance with various aspects of the present disclosure. Wireless device 705 may be an example of aspects of a UE 115 as described with reference to FIG. 1. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to dynamic TDD, etc.). Information may be passed on to other components of the device. The receiver 710 may be an example of aspects of the transceiver 1035 described with reference to FIG. 10.

UE communications manager 715 may be an example of aspects of the UE communications manager 1015 described with reference to FIG. 10. UE communications manager 715 may receive a first control message within a first control region of a first TTI that has a first duration and receive a second control message within a second control region of a second TTI that has a second duration that is less than the first duration. UE communications manager 715 may also receive, in the first control region or the second control region, a TDD pattern indicator for the second TTI. In some examples, UE communications manager 715 may determine a TDD pattern for the second TTI based on the received TDD pattern indicator. The TDD pattern may change a transmission direction for the second TTI.

In some cases, UE communications manager 715 may determine, based at least in part on the TDD pattern indicator, one or more guard periods of a TDD pattern for the second TTI, a position of a first guard period of the one or more guard periods between a first portion of the TDD pattern having a first transmission direction and a second portion of the TDD pattern having a second transmission direction different than the first transmission direction.

In some cases, UE communications manager 715 may receive, in the first control region or the second control region, a HARQ configuration indicator for the second TTI. UE communications manager 715 may determine a HARQ configuration for the second TTI based at least in part on the received HARQ configuration indicator. The second TTI may carry HARQ information responsive to a transmission in a third TTI that has a third duration that is less than the first duration. In some cases, the HARQ configuration changes the transmission direction for the second TTI.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may include a single antenna, or it may include a set of antennas.

Figure 8:
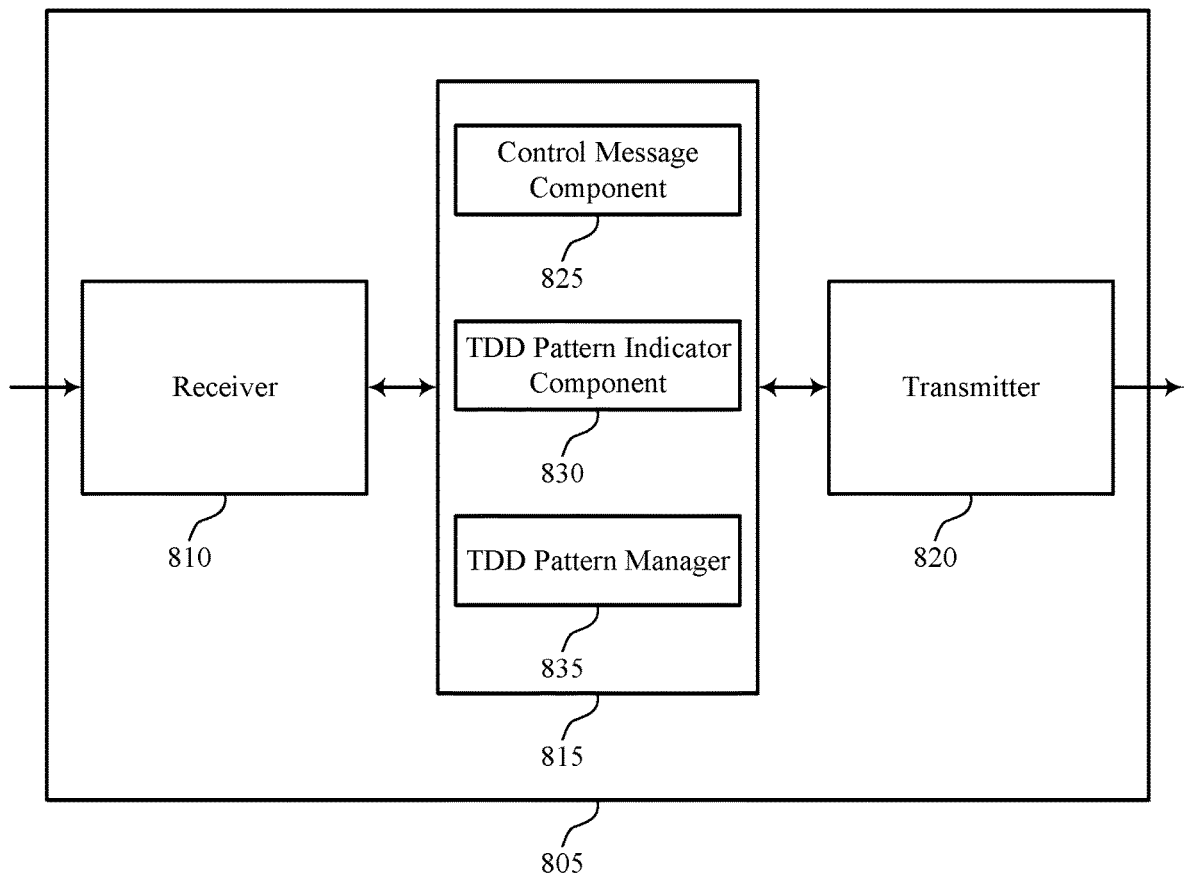

FIG. 8 shows a block diagram 800 of a wireless device 805 that supports dynamic TDD in accordance with various aspects of the present disclosure. Wireless device 805 may be an example of aspects of a wireless device 705 or a UE 115 as described with reference to FIGS. 1 and 7. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to dynamic TDD, etc.). Information may be passed on to other components of the device. The receiver 810 may be an example of aspects of the transceiver 1035 described with reference to FIG. 10.

UE communications manager 815 may be an example of aspects of the UE communications manager 1015 described with reference to FIG. 10. UE communications manager 815 may include control message component 825, TDD pattern indicator component 830, and TDD pattern manager 835. Control message component 825 may receive a first control message within a first control region of a first TTI that has a first duration. Control message component 825 may receive a second control message within a second control region of a second TTI that has a second duration that is less than the first duration. In some cases, the second duration of the second TTI includes an integer number of symbol periods or one slot. In some cases, the first TTI and the second TTI at least partially overlap in time.

TDD pattern indicator component 830 may receive, in the first control region or the second control region, a TDD pattern indicator for the second TTI. In some cases, the TDD pattern indicator is included in a first grant of resources received in the first control message, in a second grant of resources received in the second control message, or in a common search space in the control region of the first TTI. In some cases, TDD pattern indicator component 830 may receive, in the first control region or the second control region, a HARQ configuration indicator for the second TTI.

TDD pattern manager 835 may determine a TDD pattern for the second TTI based on the received TDD pattern indicator. The TDD pattern may change a transmission direction for the second TTI. In some cases, TDD pattern manager 835 may determine a HARQ configuration for the second TTI based at least in part on a received HARQ configuration indicator. The second TTI may carry HARQ information responsive to a transmission in a third TTI that has a third duration that is less than the first duration. In some cases, the HARQ configuration changes a transmission direction for the second TTI.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may include a single antenna, or it may include a set of antennas.

Figure 9:
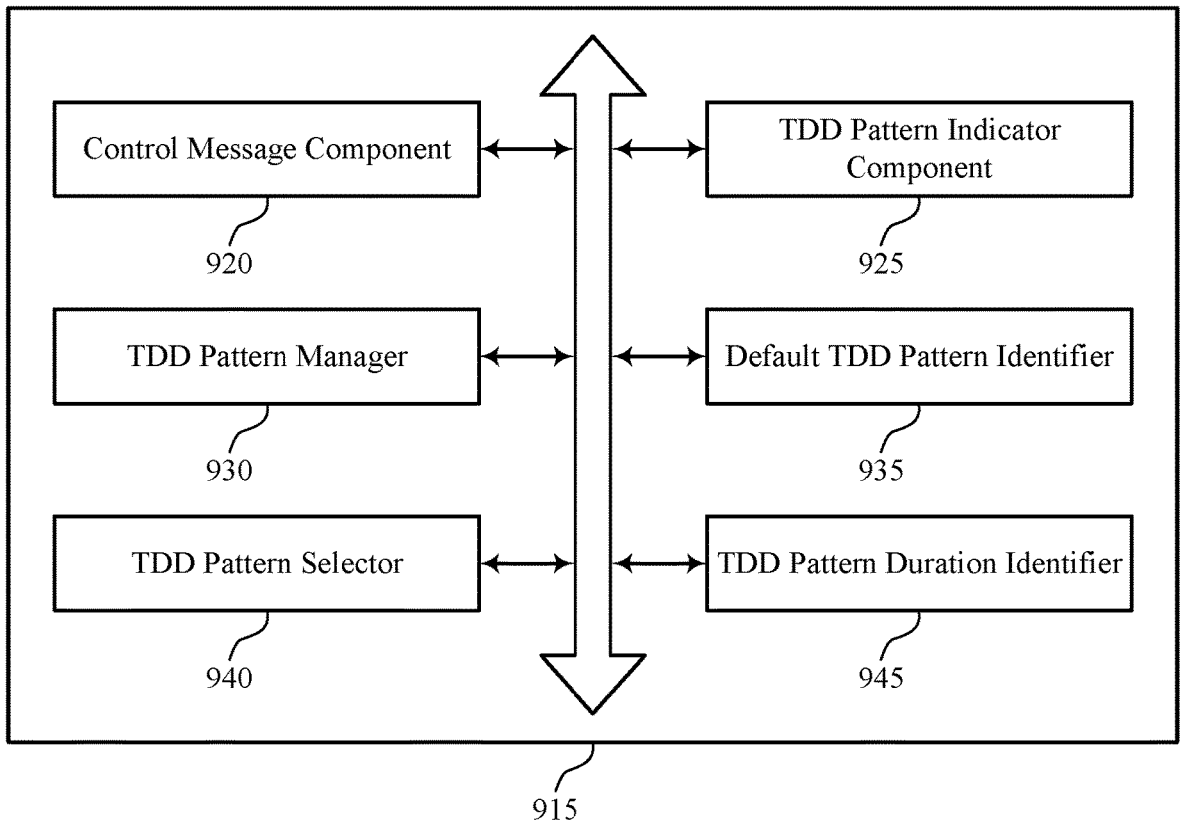

FIG. 9 shows a block diagram 900 of a UE communications manager 915 that supports dynamic TDD in accordance with various aspects of the present disclosure. The UE communications manager 915 may be an example of aspects of a UE communications manager 715, a UE communications manager 815, or a UE communications manager 1015 described with reference to FIGS. 7, 8, and 10. The UE communications manager 915 may include control message component 920, TDD pattern indicator component 925, TDD pattern manager 930, default TDD pattern identifier 935, TDD pattern selector 940, and TDD pattern duration identifier 945. Each of these modules may communicate, directly or indirectly, with one another (e.g., via one or more buses).

Control message component 920 may receive a first control message within a first control region of a first TTI that has a first duration. Control message component 920 may receive a second control message within a second control region of a second TTI that has a second duration that is less than the first duration. In some cases, the second duration of the second TTI includes an integer number of symbol periods or one slot. In some cases, the first TTI and the second TTI at least partially overlap in time.

TDD pattern indicator component 925 may receive, in the first control region or the second control region, a TDD pattern indicator for the second TTI. In some cases, the TDD pattern indicator is included in a first grant of resources received in the first control message, or in a second grant of resources received in the second control message, or in a common search space in the control region of the first TTI. In some cases, TDD pattern indicator component 925 may receive, in the first control region or the second control region, a HARQ configuration indicator for the second TTI. Receiving the HARQ configuration indicator may include receiving an indication of an entry in an association table. The association table may indicate a time relationship between a TTI conveying HARQ information and a TTI to which the TTI conveying HARQ information is responsive.

TDD pattern manager 930 may determine a TDD pattern for the second TTI based on the received TDD pattern indicator. The TDD pattern may change a transmission direction for the second TTI. In some cases, TDD pattern manager 930 may identify a reference signal for a TDD pattern for the first TTI. In some cases, TDD pattern manager 930 may determine to skip monitoring a symbol period during the second TTI associated with the identified reference signal. In some cases, TDD pattern manager 930 may determine, based at least in part on the TDD pattern indicator, one or more guard periods of a TDD pattern for the second TTI, a position of a first guard period of the one or more guard periods between a first portion of the TDD pattern having a first transmission direction and a second portion of the TDD pattern having a second transmission direction different than the first transmission direction.

In some cases, TDD pattern manager 930 may determine a HARQ configuration for the second TTI based at least in part on a received HARQ configuration indicator. The second TTI may carry HARQ information responsive to a transmission in a third TTI that has a third duration that is less than the first duration. In some cases, the HARQ configuration changes a transmission direction for the second TTI.

Default TDD pattern identifier 935 may identify a default TDD pattern associated with the second TTI. The determined TDD pattern may change the transmission direction for at least a portion of the default TDD pattern.

TDD pattern selector 940 may select the TDD pattern for the second TTI that is associated with the TDD pattern indicator entry corresponding to the received TDD pattern indicator. In some cases, determining the TDD pattern for the second TTI includes selecting the TDD pattern from among a set of predetermined TDD patterns based on the received TDD pattern indicator. In some cases, selecting the TDD pattern from among a set of predetermined TDD patterns includes reading a table including a set of TDD pattern indicator entries associated with respective TDD patterns.

In some cases, TDD pattern selector 940 may identify a plurality of reference HARQ configurations and select the HARQ configuration from the plurality of reference HARQ configurations. In some cases, TDD pattern selector 940 may identify a value for a parameter of a channel used to receive the first control message and the second control message. Accordingly, TDD pattern selector 940 may select the HARQ configuration for the second TTI based at least in part on the identified value for the parameter of the channel. The parameter of the channel may be a length of the second TTI, or an acknowledgement transmission delay, or a downlink load, or an uplink load, or a combination thereof.

TDD pattern duration identifier 945 may identify that the determined TDD pattern applies to a predetermined number of TTIs, including the second TTI that has the second duration. In some cases, TDD pattern duration identifier 945 may identify a HARQ timing offset for the second TTI. The HARQ configuration indicator may identify the HARQ timing offset. Identifying the HARQ timing offset may include identifying a value for a parameter associated with a HARQ procedure and identifying the HARQ timing offset for the second TTI based at least in part on the identified value for the parameter of the channel. The parameter associated with the HARQ procedure may be or include a downlink load, or an uplink load, or an interference pattern, or a downlink processing time, or an uplink processing time, or a combination thereof.

Figure 10:
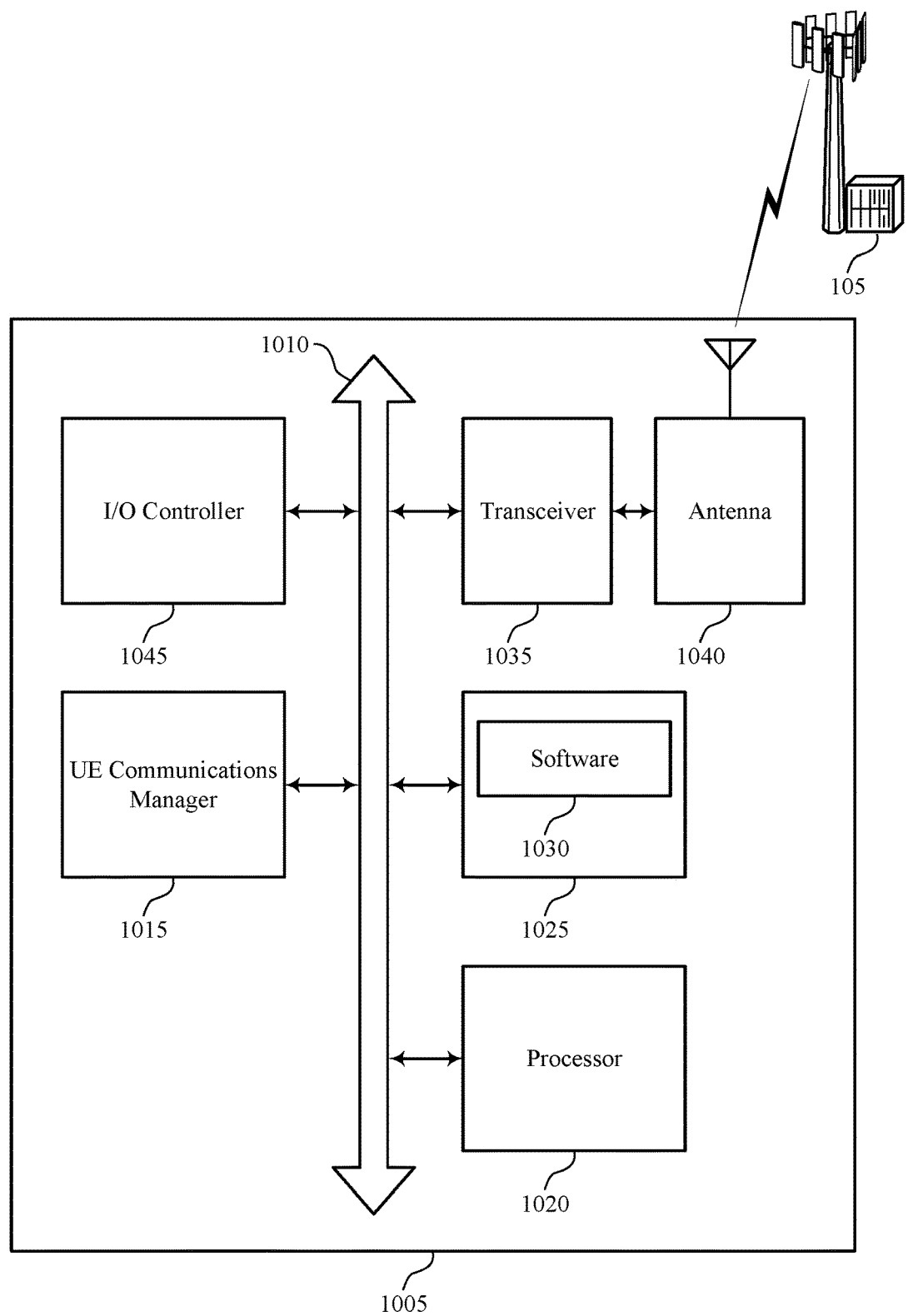
FIG. 10 illustrates a block diagram of a system including a UE that supports dynamic TDD in accordance with aspects of the present disclosure.

FIG. 10 shows a diagram of a system 1000 including a device 1005 that supports dynamic TDD in accordance with various aspects of the present disclosure. Device 1005 may be an example of or include the components of wireless device 705, wireless device 805, or a UE 115 as described above, e.g., with reference to FIGS. 1, 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more busses (e.g., bus 1010). Device 1005 may communicate wirelessly with one or more base stations 105.

Processor 1020 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting dynamic TDD).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support dynamic TDD. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas. In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system.

Figure 11:
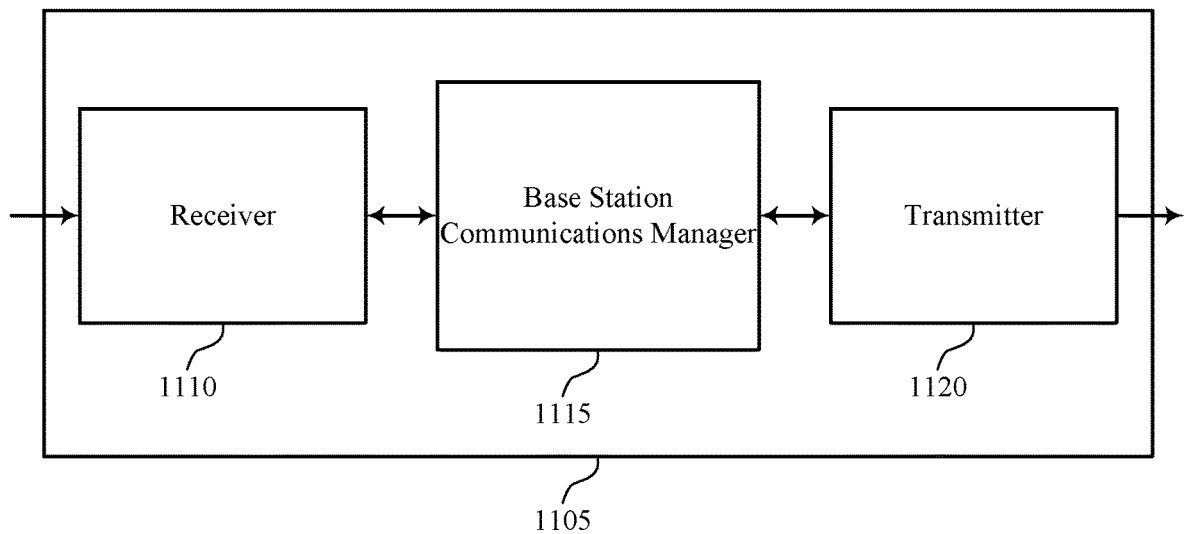
FIGS. 11 through 13 show block diagrams of a device that supports dynamic TDD in accordance with aspects of the present disclosure.

FIG. 11 shows a block diagram 1100 of a wireless device 1105 that supports dynamic TDD in accordance with various aspects of the present disclosure. Wireless device 1105 may be an example of aspects of a base station 105 as described with reference to FIG. 1. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to dynamic TDD, etc.). Information may be passed on to other components of the device. The receiver 1110 may be an example of aspects of the transceiver 1435 described with reference to FIG. 14.

Base station communications manager 1115 may be an example of aspects of the base station communications manager 1415 described with reference to FIG. 14. Base station communications manager 1115 may transmit a first control message within a first control region of a first TTI that has a first duration and transmit a second control message within a second control region of a second TTI that has a second duration that is less than the first duration. Base station communications manager 1115 may also determine a TDD pattern for the second TTI. In some examples, the TDD pattern changes a transmission direction for the second TTI. In some cases, the TDD pattern includes one or more guard periods of the second TTI. In such cases, the position of a first guard period of the one or more guard periods may be between a first portion of the TDD pattern having a first transmission direction and a second portion of the TDD pattern having a second transmission direction different than the first transmission direction. The base station communications manager 1115 may transmit (e.g., after determining the TDD pattern), in the first control region or the second control region, a TDD pattern indicator identifying the determined TDD pattern for the second TTI.

In some cases, base station communications manager 1115 may determine a HARQ configuration for the second TTI and the second TTI may carry HARQ information responsive to a transmission in a third TTI that has a third duration that is less than the first duration. The HARQ configuration may change a transmission direction for the second TTI. In some examples, base station communications manager 1115 may transmit, in the first control region or the second control region, a HARQ configuration indicator identifying the determined HARQ configuration for the second TTI.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may include a single antenna, or it may include a set of antennas.

Figure 12:
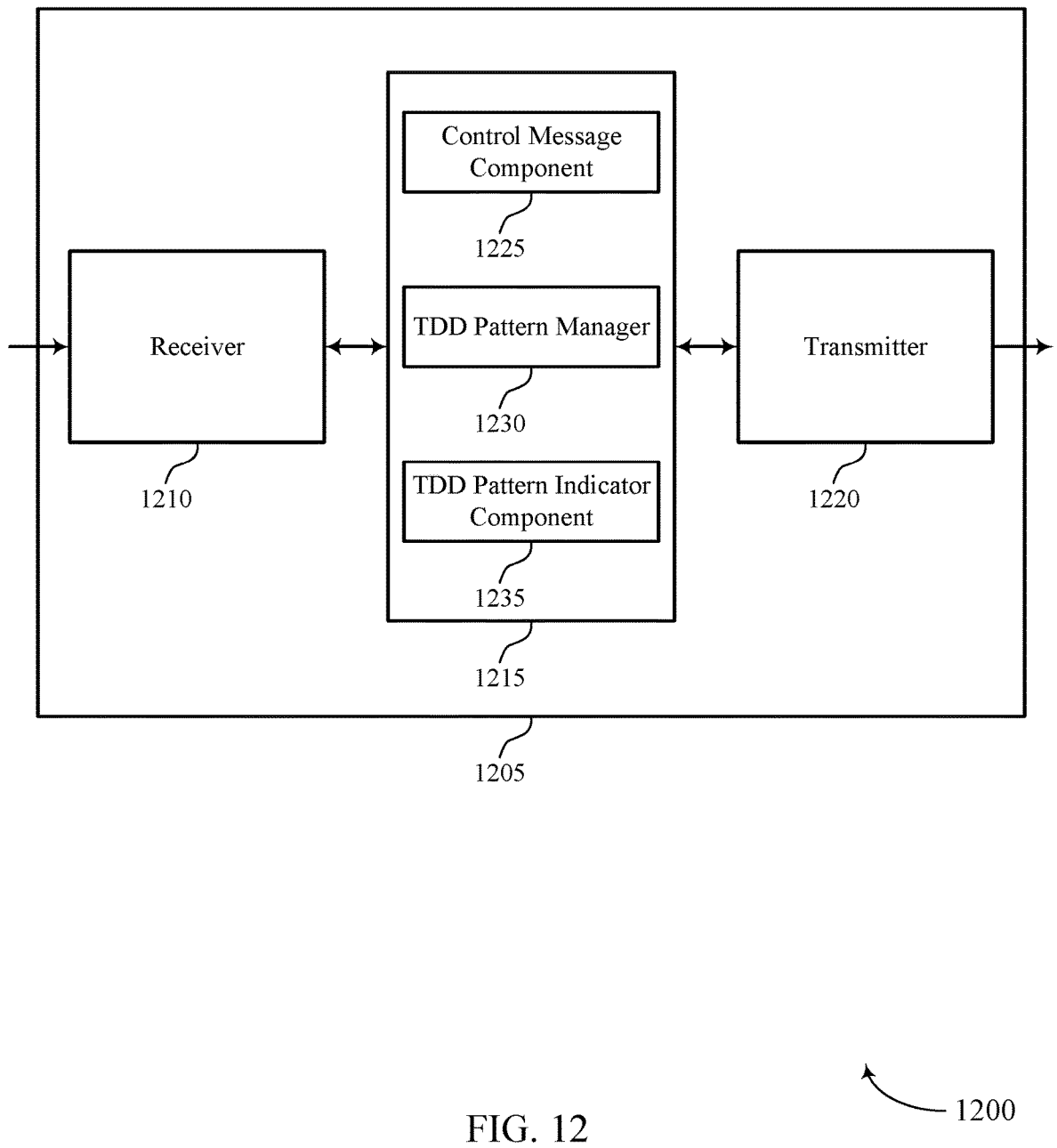

FIG. 12 shows a block diagram 1200 of a wireless device 1205 that supports dynamic TDD in accordance with various aspects of the present disclosure. Wireless device 1205 may be an example of aspects of a wireless device 1105 or a base station 105 as described with reference to FIGS. 1 and 11. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to dynamic TDD, etc.). Information may be passed on to other components of the device. The receiver 1210 may be an example of aspects of the transceiver 1435 described with reference to FIG. 14.

Base station communications manager 1215 may be an example of aspects of the base station communications manager 1415 described with reference to FIG. 14. Base station communications manager 1215 may include control message component 1225, TDD pattern manager 1230, and TDD pattern indicator component 1235.

Control message component 1225 may transmit a first control message within a first control region of a first TTI that has a first duration and transmit a second control message within a second control region of a second TTI that has a second duration that is less than the first duration. In some cases, the second duration includes or is made up of an integer number of symbol periods or one slot.

TDD pattern manager 1230 may determine a TDD pattern for the second TTI. The TDD pattern may change a transmission direction for the second TTI. In some cases, TDD pattern manager 1230 may determine the TDD pattern for the second TTI based on an identified transmission direction. In some cases, TDD pattern manager 1230 may determine the TDD pattern for the second TTI based on an identified transmission direction associated with the time interval adjacent the second TTI. In some cases, the TDD pattern for the second TTI includes at least one of downlink resources, or uplink resources, or one or more guard periods, or any combination thereof. In some cases, TDD pattern manager 1230 may determine a HARQ configuration for the second TTI and the second TTI may carry HARQ information responsive to a transmission in a third TTI that has a third duration that is less than the first duration. The HARQ configuration may change a transmission direction for the second TTI.

In some examples, the TDD pattern includes or is made up of one or more guard periods of the second TTI. In such examples, the position of a first guard period of the one or more guard periods may be between a first portion of the TDD pattern having a first transmission direction and a second portion of the TDD pattern having a second transmission direction different than the first transmission direction. One or more of the guard periods may have a duration that is less than a symbol period. In some examples, a first boundary of a guard period of the plurality of guard periods is aligned with a symbol period of a TDD pattern for the first TTI, and a second boundary of the guard period is not aligned with a symbol period of a TDD pattern for the first TTI.

In some cases, the TDD pattern manager 1230 may identify a third transmission direction associated with a third portion of a third TTI. The third TTI may follow the second TTI. In such cases, the TDD pattern for the second TTI may include a second guard period of the one or more guard periods. The second guard period may be positioned at an end of the second TTI between the third portion and the second portion of the TDD pattern having the second transmission direction. The second transmission direction may be different than the third transmission direction.

In some cases, the TDD pattern manager 1230 may identify a third transmission direction associated with a third portion of a third TTI. The third TTI may precede the second TTI. In such cases, the TDD pattern for the second TTI may include a second guard period of the one or more guard periods. The second guard period may be positioned at the beginning of the second TTI between the third portion and the first portion of the TDD pattern having the first transmission direction. The first transmission direction may be different than the third transmission direction.

TDD pattern indicator component 1235 may transmit, in the first control region or the second control region, a TDD pattern indicator identifying the determined TDD pattern for the second TTI. The TDD pattern indicator component 1235 may transmit the TDD pattern indicator in a first grant of resources received in the first control message, in a second grant of resources received in the second control message, or in a common search space in the control region of the first TTI. In some cases, TDD pattern indicator component 1235 may transmit, in the first control region or the second control region, a HARQ configuration indicator identifying the determined HARQ configuration for the second TTI.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may include a single antenna, or it may include a set of antennas.

Figure 13:
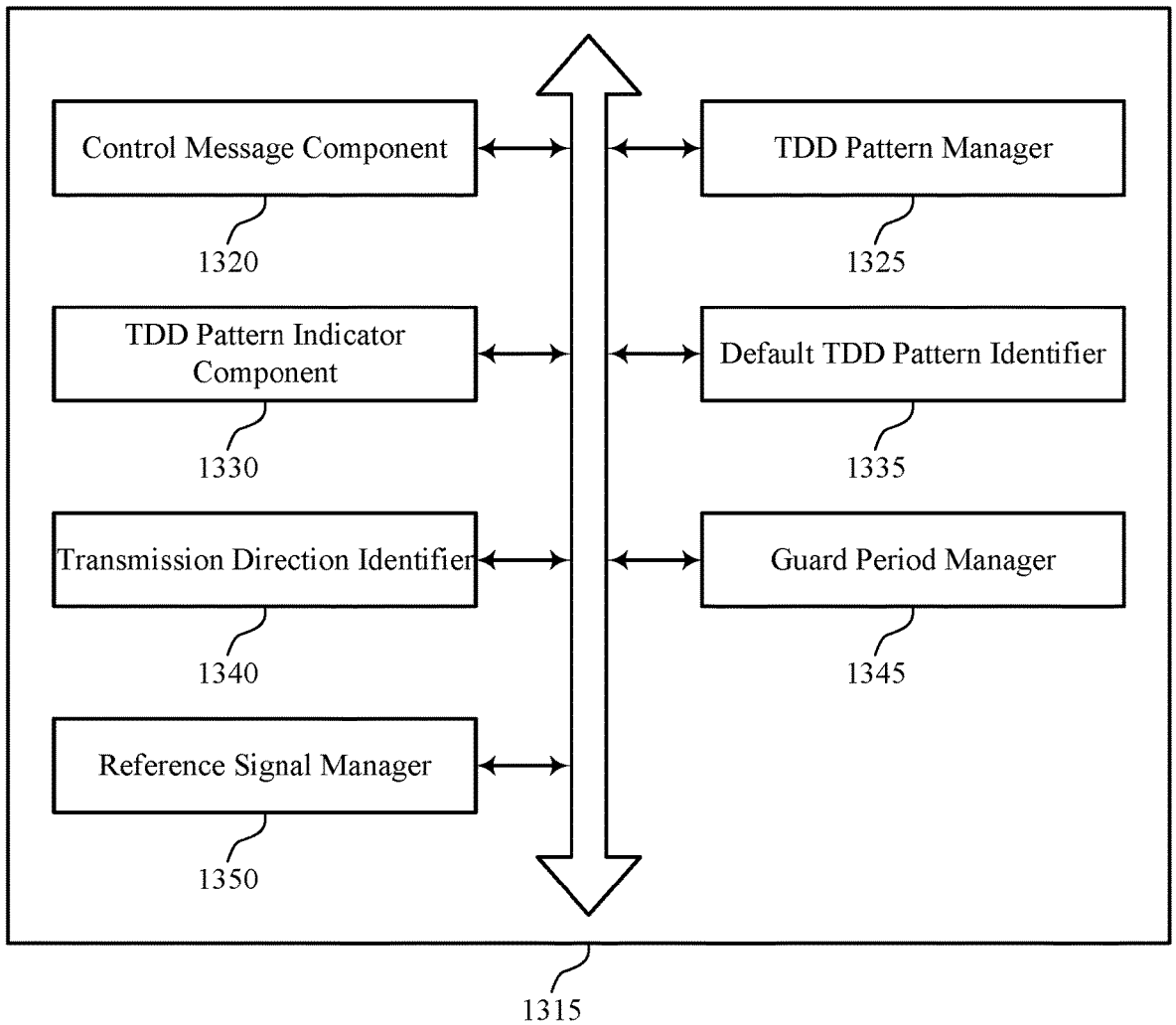

FIG. 13 shows a block diagram 1300 of a base station communications manager 1315 that supports dynamic TDD in accordance with various aspects of the present disclosure. The base station communications manager 1315 may be an example of aspects of a base station communications manager 1415 described with reference to FIGS. 11, 12, and 14. The base station communications manager 1315 may include control message component 1320, TDD pattern manager 1325, TDD pattern indicator component 1330, default TDD pattern identifier 1335, transmission direction identifier 1340, guard period manager 1345, and reference signal manager 1350. Each of these modules may communicate, directly or indirectly, with one another (e.g., via one or more buses).

Control message component 1320 may transmit a first control message within a first control region of a first TTI that has a first duration and transmit a second control message within a second control region of a second TTI that has a second duration that is less than the first duration. In some cases, control message component 1320 may identify a value for a parameter of a channel used to transmit the first control message and the second control message. The parameter of the channel may be or include a length of the second TTI, or an acknowledgement transmission delay, or a downlink load, or an uplink load, or a combination thereof.

TDD pattern manager 1325 may determine a TDD pattern for the second TTI. The TDD pattern may change a transmission direction for the second TTI. TDD pattern manager 1325 may determine the TDD pattern for the second TTI based on an identified transmission direction, and/or determine the TDD pattern for the second TTI based on an identified transmission direction associated with the time interval adjacent the second TTI. In some cases, the TDD pattern for the second TTI includes at least one of downlink resources, or uplink resources, or one or more guard periods, or any combination thereof.

In some cases, TDD pattern manager 1325 may determine a HARQ configuration for the second TTI and the second TTI may carry HARQ information responsive to a transmission in a third TTI that has a third duration that is less than the first duration. The HARQ configuration may change a transmission direction for the second TTI. Determining the HARQ configuration may include identifying a plurality of reference HARQ configurations and selecting the HARQ configuration from the plurality of reference HARQ configurations. TDD pattern manager 1325 may select the HARQ configuration for the second TTI based at least in part on the identified value for the parameter of the channel.

In some cases, TDD pattern manager 1325 may identify a HARQ timing offset for the second TTI. The HARQ configuration indicator may identify the HARQ timing offset, identifying the HARQ timing offset may include identifying a value for a parameter associated with a HARQ procedure and identifying the HARQ timing offset for the second TTI based at least in part on the identified value for the parameter of the channel. The parameter associated with the HARQ procedure may be or include a downlink load, or an uplink load, or an interference pattern, or a downlink processing time, or an uplink processing time, or a combination thereof.

TDD pattern indicator component 1330 may transmit, in the first control region or the second control region, a TDD pattern indicator identifying the determined TDD pattern for the second TTI. TDD pattern indicator component 1330 may transmit the TDD pattern indicator in a first grant of resources received in the first control message, or in a second grant of resources received in the second control message, or in a common search space in the control region of the first TTI, or any combination thereof.

In some cases, TDD pattern indicator component 1330 may transmit, in the first control region or the second control region, a HARQ configuration indicator identifying the determined HARQ configuration for the second TTI. In some cases, transmitting the HARQ configuration indicator includes transmitting an indication of an entry in an association table. The association table may indicate a time relationship between a TTI conveying HARQ information and a TTI to which the TTI conveying HARQ information is responsive.

Default TDD pattern identifier 1335 may identify a default TDD pattern associated with the second TTI. The determined TDD pattern may change the transmission direction for at least a portion of the default TDD pattern. Transmission direction identifier 1340 may identify a transmission direction associated with the first TTI during at least a portion of the second duration and identify a transmission direction associated with a time interval adjacent the second TTI.

Guard period manager 1345 may determine a position and a duration of a guard period for the second TTI based on the identified transmission direction associated with the time interval adjacent to the second TTI. In some cases, guard period manager 1345 may identify the symbol period of a reference signal for a TDD pattern for the first TTI. In such cases, the guard period manager 1345 may also determine the position of the one or more guard periods based at least in part on the identified symbol period of the reference signal. The reference signal may be or include a CRS or DMRS.

In some cases, guard period manager 1345 may identify a boundary of a symbol period of a TDD pattern for the first TTI. In such cases, the guard period manager 1345 may determine the position of a guard period of the one or more guard periods based at least in part on the identified boundary. Determining the position of the guard period may include aligning a boundary of the guard period with the identified boundary of the symbol period.

In some cases, guard period manager 1345 may identify a transmission type associated with the first TTI. In such cases, guard period manager 1345 may also identify positions of the one or more guard periods of the TDD pattern within the second TTI based at least in part on the identified transmission direction associated with the first TTI. The identified transmission type associated with the first TTI may be an uplink transmission, or a downlink transmission, or an MBSFN transmission.

In some examples, guard period manager 1345 may identify a slot index associated with the first TTI. In some examples, guard period manager 1345 may also identify positions of the one or more guard periods of the TDD pattern based at least in part on the slot index associated with the first TTI.

Reference signal manager 1350 may identify a conflict between the second TTI and a first reference signal pattern for one or more reference signals associated with the first TTI. Reference signal manager 1350 may transmit the one or more reference signals according to a second reference signal pattern. In some cases, reference signal manager 1350 may transmit an indication of the second reference signal pattern in the first control region.

Figure 14:
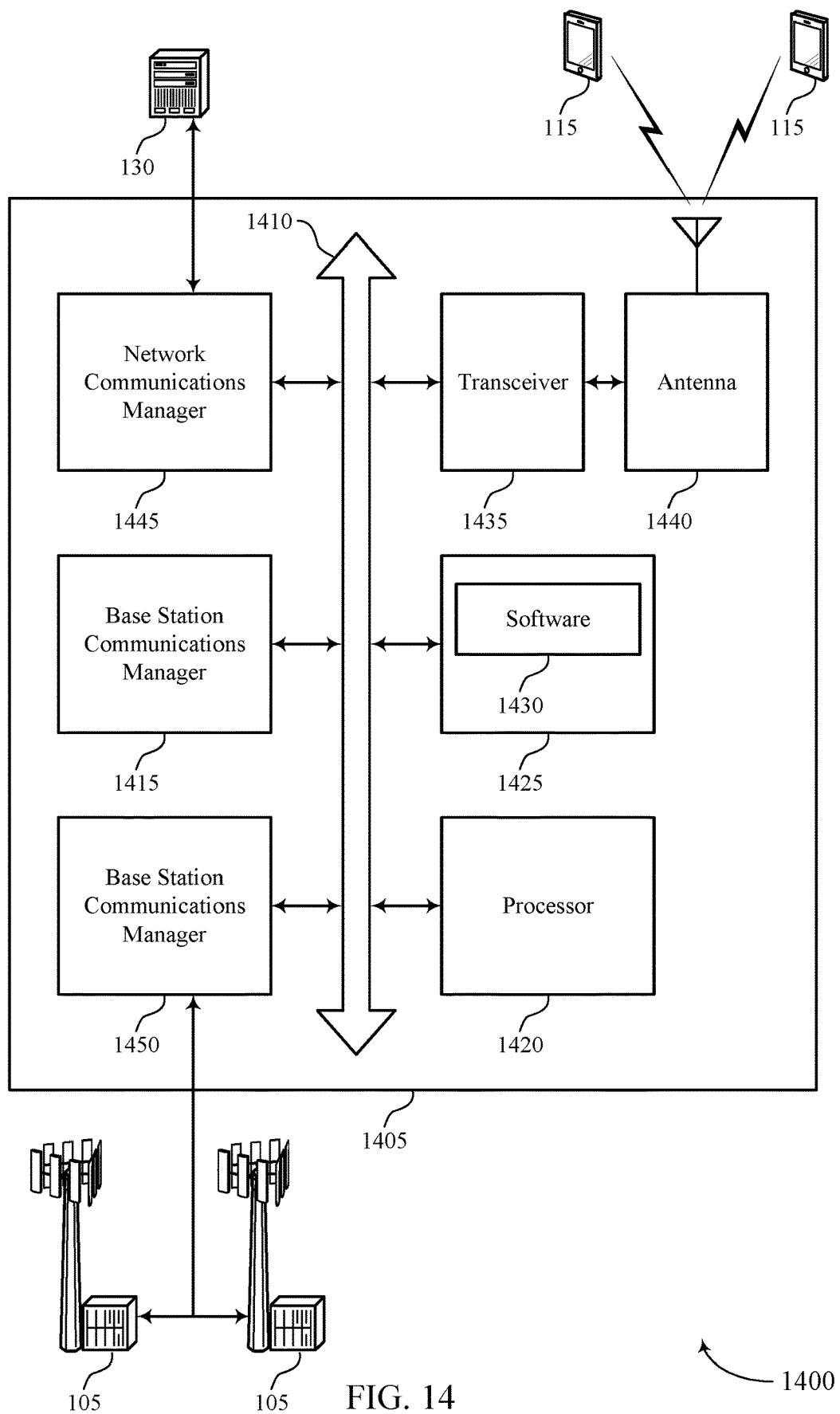
FIG. 14 illustrates a block diagram of a system including a base station that supports dynamic TDD in accordance with aspects of the present disclosure.

FIG. 14 shows a diagram of a system 1400 including a device 1405 that supports dynamic TDD in accordance with various aspects of the present disclosure. Device 1405 may be an example of or include the components of base station 105 as described above, e.g., with reference to FIG. 1. Device 1405 may include components for bi-directional voice and data communications including components for transmitting and receiving communications, including base station communications manager 1415, processor 1420, memory 1425, software 1430, transceiver 1435, antenna 1440, network communications manager 1445, and base station communications manager 1450. These components may be in electronic communication via one or more busses (e.g., bus 1410). Device 1405 may communicate wirelessly with one or more UEs 115.

Base station communications manager 1415 may manage communications with other base stations 105, and may include a controller or scheduler for controlling communications with UEs 115 in cooperation with other base stations 105. For example, the base station communications manager 1415 may coordinate scheduling for transmissions to UEs 115 for various interference mitigation techniques such as beamforming or joint transmission. In some examples, base station communications manager 1415 may provide an X2 interface within a Long Term Evolution (LTE)/LTE-A wireless communication network technology to provide communication between base stations 105.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting dynamic TDD).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support dynamic TDD. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas. In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Figure 15:
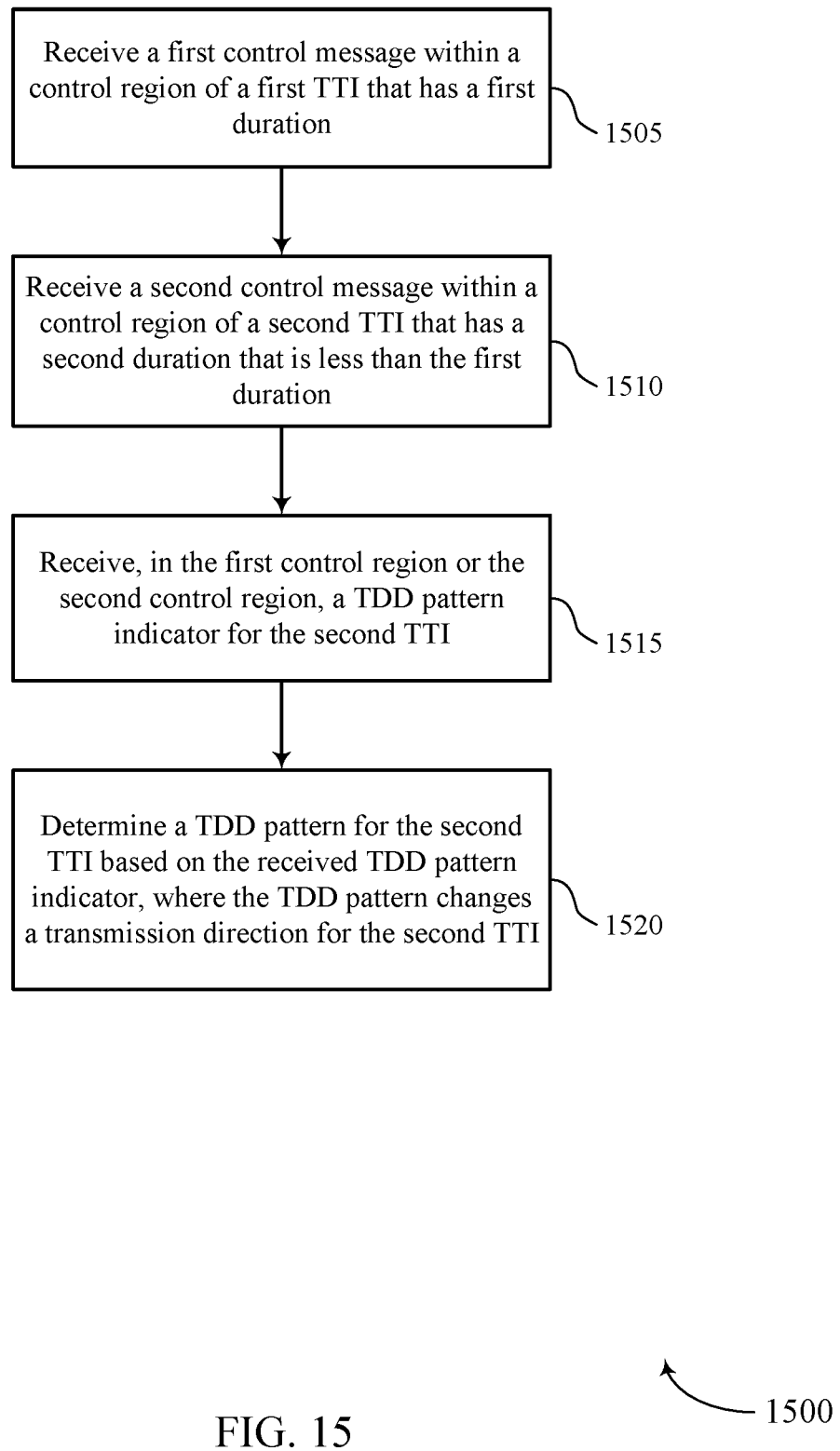
FIGS. 15 through 23 illustrate methods for dynamic TDD in accordance with aspects of the present disclosure.

FIG. 15 shows a flowchart illustrating a method 1500 for dynamic TDD in accordance with various aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1505, the UE 115 may receive a first control message within a first control region of a first TTI that has a first duration. The operations of block 1505 may be performed according to the methods described with reference to FIGS. 1 through 6. In certain examples, aspects of the operations of block 1505 may be performed by a control message component as described with reference to FIGS. 7 through 10.

At block 1510, the UE 115 may receive a second control message within a second control region of a second TTI that has a second duration that is less than the first duration. The operations of block 1510 may be performed according to the methods described with reference to FIGS. 1 through 6. In certain examples, aspects of the operations of block 1510 may be performed by a control message component as described with reference to FIGS. 7 through 10.

At block 1515, the UE 115 may receive, in the first control region or the second control region, a TDD pattern indicator for the second TTI. The operations of block 1515 may be performed according to the methods described with reference to FIGS. 1 through 6. In certain examples, aspects of the operations of block 1515 may be performed by a TDD pattern indicator component as described with reference to FIGS. 7 through 10.

At block 1520, the UE 115 may determine a TDD pattern for the second TTI based at least in part on the received TDD pattern indicator, where the TDD pattern changes a transmission direction for the second TTI. The operations of block 1520 may be performed according to the methods described with reference to FIGS. 1 through 6. In certain examples, aspects of the operations of block 1520 may be performed by a TDD pattern manager as described with reference to FIGS. 7 through 10.

Figure 16:
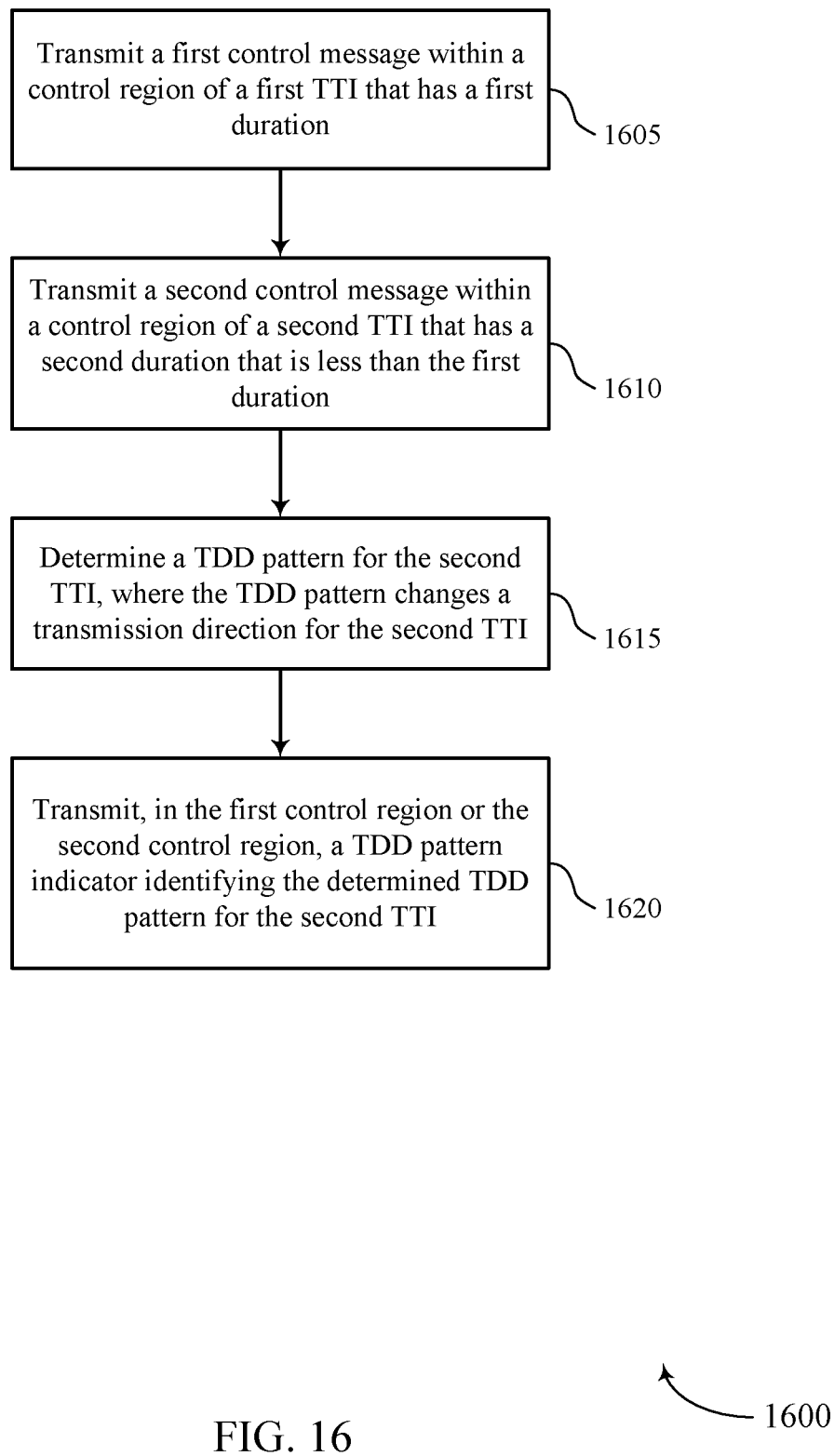

FIG. 16 shows a flowchart illustrating a method 1600 for dynamic TDD in accordance with various aspects of the present disclosure. The operations of method 1600 may be implemented by a base station 105 or its components as described herein. For example, the operations of method 1600 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1605, the base station 105 may transmit a first control message within a first control region of a first TTI that has a first duration. The operations of block 1605 may be performed according to the methods described with reference to FIGS. 1 through 6. In certain examples, aspects of the operations of block 1605 may be performed by a control message component as described with reference to FIGS. 11 through 14.

At block 1610, the base station 105 may transmit a second control message within a second control region of a second TTI that has a second duration that is less than the first duration. The operations of block 1610 may be performed according to the methods described with reference to FIGS. 1 through 6. In certain examples, aspects of the operations of block 1610 may be performed by a control message component as described with reference to FIGS. 11 through 14.

At block 1615, the base station 105 may determine a TDD pattern for the second TTI, where the TDD pattern changes a transmission direction for the second TTI. The operations of block 1615 may be performed according to the methods described with reference to FIGS. 1 through 6. In certain examples, aspects of the operations of block 1615 may be performed by a TDD pattern manager as described with reference to FIGS. 11 through 14.

At block 1620, the base station 105 may transmit, in the first control region or the second control region, a TDD pattern indicator identifying the determined TDD pattern for the second TTI. The operations of block 1620 may be performed according to the methods described with reference to FIGS. 1 through 6. In certain examples, aspects of the operations of block 1620 may be performed by a TDD pattern indicator component as described with reference to FIGS. 11 through 14.

Figure 17:
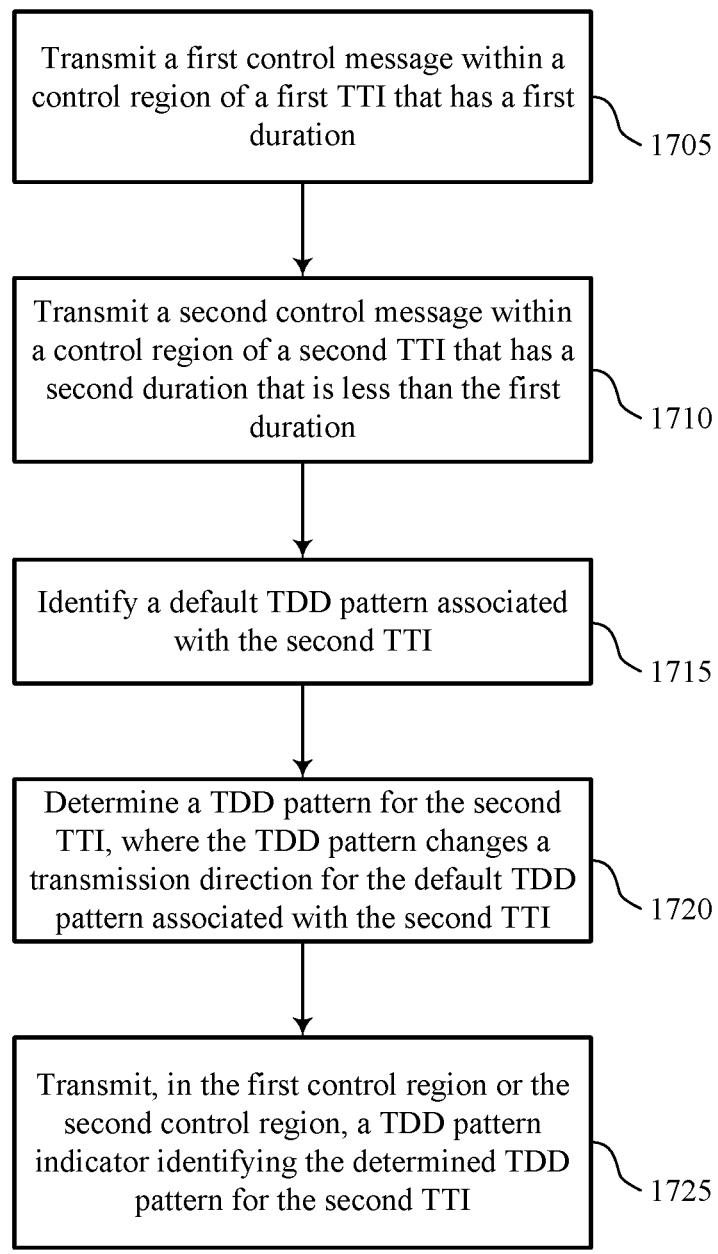

FIG. 17 shows a flowchart illustrating a method 1700 for dynamic TDD in accordance with various aspects of the present disclosure. The operations of method 1700 may be implemented by a base station 105 or its components as described herein. For example, the operations of method 1700 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1705, the base station 105 may transmit a first control message within a first control region of a first TTI that has a first duration. The operations of block 1705 may be performed according to the methods described with reference to FIGS. 1 through 6. In certain examples, aspects of the operations of block 1705 may be performed by a control message component as described with reference to FIGS. 11 through 14.

At block 1710, the base station 105 may transmit a second control message within a second control region of a second TTI that has a second duration that is less than the first duration. The operations of block 1710 may be performed according to the methods described with reference to FIGS. 1 through 6. In certain examples, aspects of the operations of block 1710 may be performed by a control message component as described with reference to FIGS. 11 through 14.

At block 1715, the base station 105 may identify a default TDD pattern associated with the second TTI. The operations of block 1715 may be performed according to the methods described with reference to FIGS. 1 through 6. In certain examples, aspects of the operations of block 1715 may be performed by a default TDD pattern identifier as described with reference to FIGS. 11 through 14.

At block 1720, the base station 105 may determine a TDD pattern for the second TTI, where the TDD pattern changes a transmission direction for the default TDD pattern associated with the second TTI. The operations of block 1720 may be performed according to the methods described with reference to FIGS. 1 through 6. In certain examples, aspects of the operations of block 1720 may be performed by a TDD pattern manager as described with reference to FIGS. 11 through 14.

At block 1725, the base station 105 may transmit, in the first control region or the second control region, a TDD pattern indicator identifying the determined TDD pattern for the second TTI. The operations of block 1725 may be performed according to the methods described with reference to FIGS. 1 through 6. In certain examples, aspects of the operations of block 1725 may be performed by a TDD pattern indicator component as described with reference to FIGS. 11 through 14.

Figure 18:
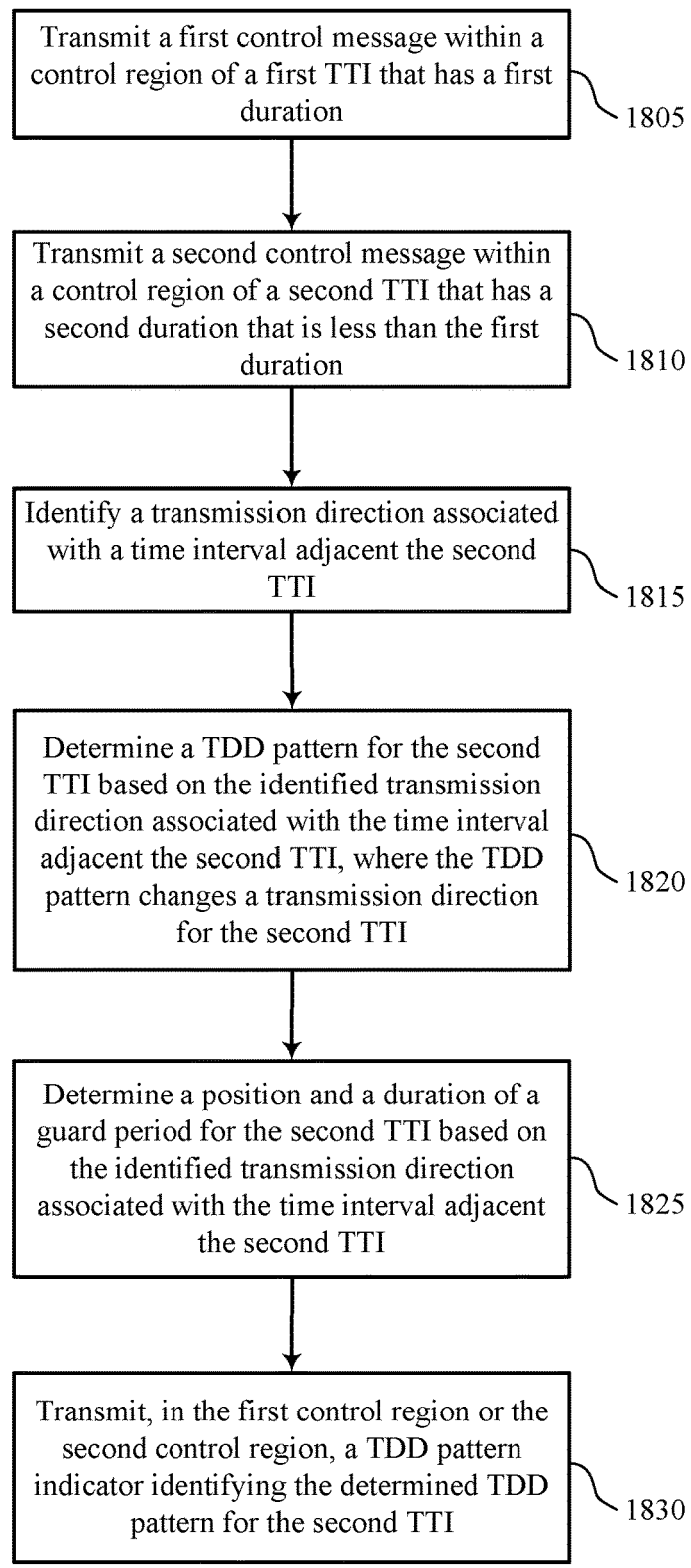

FIG. 18 shows a flowchart illustrating a method 1800 for dynamic TDD in accordance with various aspects of the present disclosure. The operations of method 1800 may be implemented by a base station 105 or its components as described herein. For example, the operations of method 1800 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1805, the base station 105 may transmit a first control message within a first control region of a first TTI that has a first duration. The operations of block 1805 may be performed according to the methods described with reference to FIGS. 1 through 6. In certain examples, aspects of the operations of block 1805 may be performed by a control message component as described with reference to FIGS. 11 through 14.

At block 1810, the base station 105 may transmit a second control message within a second control region of a second TTI that has a second duration that is less than the first duration. The operations of block 1810 may be performed according to the methods described with reference to FIGS. 1 through 6. In certain examples, aspects of the operations of block 1810 may be performed by a control message component as described with reference to FIGS. 11 through 14.

At block 1815, the base station 105 may identify a transmission direction associated with a time interval adjacent to the second TTI. The operations of block 1815 may be performed according to the methods described with reference to FIGS. 1 through 6. In certain examples, aspects of the operations of block 1815 may be performed by a transmission direction identifier as described with reference to FIGS. 11 through 14.

At block 1820, the base station 105 may determine a TDD pattern for the second TTI based on the identified transmission direction associated with the time interval adjacent the second TTI, where the TDD pattern changes a transmission direction for the second TTI. The operations of block 1820 may be performed according to the methods described with reference to FIGS. 1 through 6. In certain examples, aspects of the operations of block 1820 may be performed by a TDD pattern manager as described with reference to FIGS. 11 through 14.

At block 1825, the base station 105 may determine a position and a duration of a guard period for the second TTI based on the identified transmission direction associated with the time interval adjacent to the second TTI. The operations of block 1825 may be performed according to the methods described with reference to FIGS. 1 through 6. In certain examples, aspects of the operations of block 1825 may be performed by a guard period manager as described with reference to FIGS. 11 through 14.

At block 1830, the base station 105 may transmit, in the first control region or the second control region, a TDD pattern indicator identifying the determined TDD pattern for the second TTI. The operations of block 1830 may be performed according to the methods described with reference to FIGS. 1 through 6. In certain examples, aspects of the operations of block 1830 may be performed by a TDD pattern indicator component as described with reference to FIGS. 11 through 14.

Figure 19:
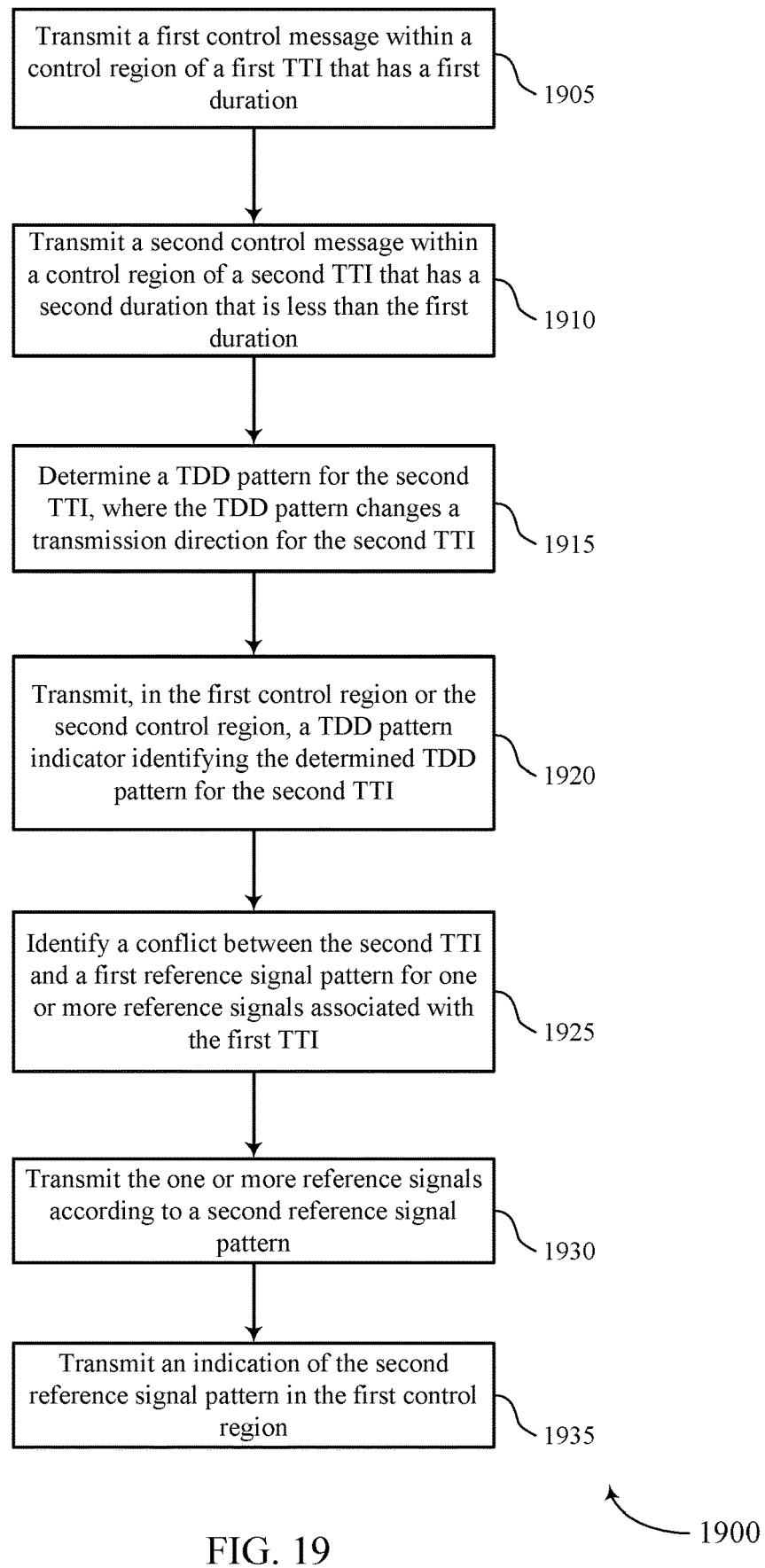

FIG. 19 shows a flowchart illustrating a method 1900 for dynamic TDD in accordance with various aspects of the present disclosure. The operations of method 1900 may be implemented by a base station 105 or its components as described herein. For example, the operations of method 1900 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1905, the base station 105 may transmit a first control message within a first control region of a first TTI that has a first duration. The operations of block 1905 may be performed according to the methods described with reference to FIGS. 1 through 6. In certain examples, aspects of the operations of block 1905 may be performed by a control message component as described with reference to FIGS. 11 through 14.

At block 1910, the base station 105 may transmit a second control message within a second control region of a second TTI that has a second duration that is less than the first duration. The operations of block 1910 may be performed according to the methods described with reference to FIGS. 1 through 6. In certain examples, aspects of the operations of block 1910 may be performed by a control message component as described with reference to FIGS. 11 through 14.

At block 1915, the base station 105 may determine a TDD pattern for the second TTI, where the TDD pattern changes a transmission direction for the second TTI. The operations of block 1915 may be performed according to the methods described with reference to FIGS. 1 through 6. In certain examples, aspects of the operations of block 1915 may be performed by a TDD pattern manager as described with reference to FIGS. 11 through 14.

At block 1920, the base station 105 may transmit, in the first control region or the second control region, a TDD pattern indicator identifying the determined TDD pattern for the second TTI. The operations of block 1920 may be performed according to the methods described with reference to FIGS. 1 through 6. In certain examples, aspects of the operations of block 1920 may be performed by a TDD pattern indicator component as described with reference to FIGS. 11 through 14.

At block 1925, the base station 105 may identify a conflict between the second TTI and a first reference signal pattern for one or more reference signals associated with the first TTI. The operations of block 1925 may be performed according to the methods described with reference to FIGS. 1 through 6. In certain examples, aspects of the operations of block 1925 may be performed by a reference signal manager as described with reference to FIGS. 11 through 14.

At block 1930, the base station 105 may transmit the one or more reference signals according to a second reference signal pattern. The operations of block 1930 may be performed according to the methods described with reference to FIGS. 1 through 6. In certain examples, aspects of the operations of block 1930 may be performed by a reference signal manager as described with reference to FIGS. 11 through 14.

At block 1935, the base station 105 may transmit an indication of the second reference signal pattern in the first control region. The operations of block 1935 may be performed according to the methods described with reference to FIGS. 1 through 6. In certain examples, aspects of the operations of block 1935 may be performed by a reference signal manager as described with reference to FIGS. 11 through 14.

Figure 20:
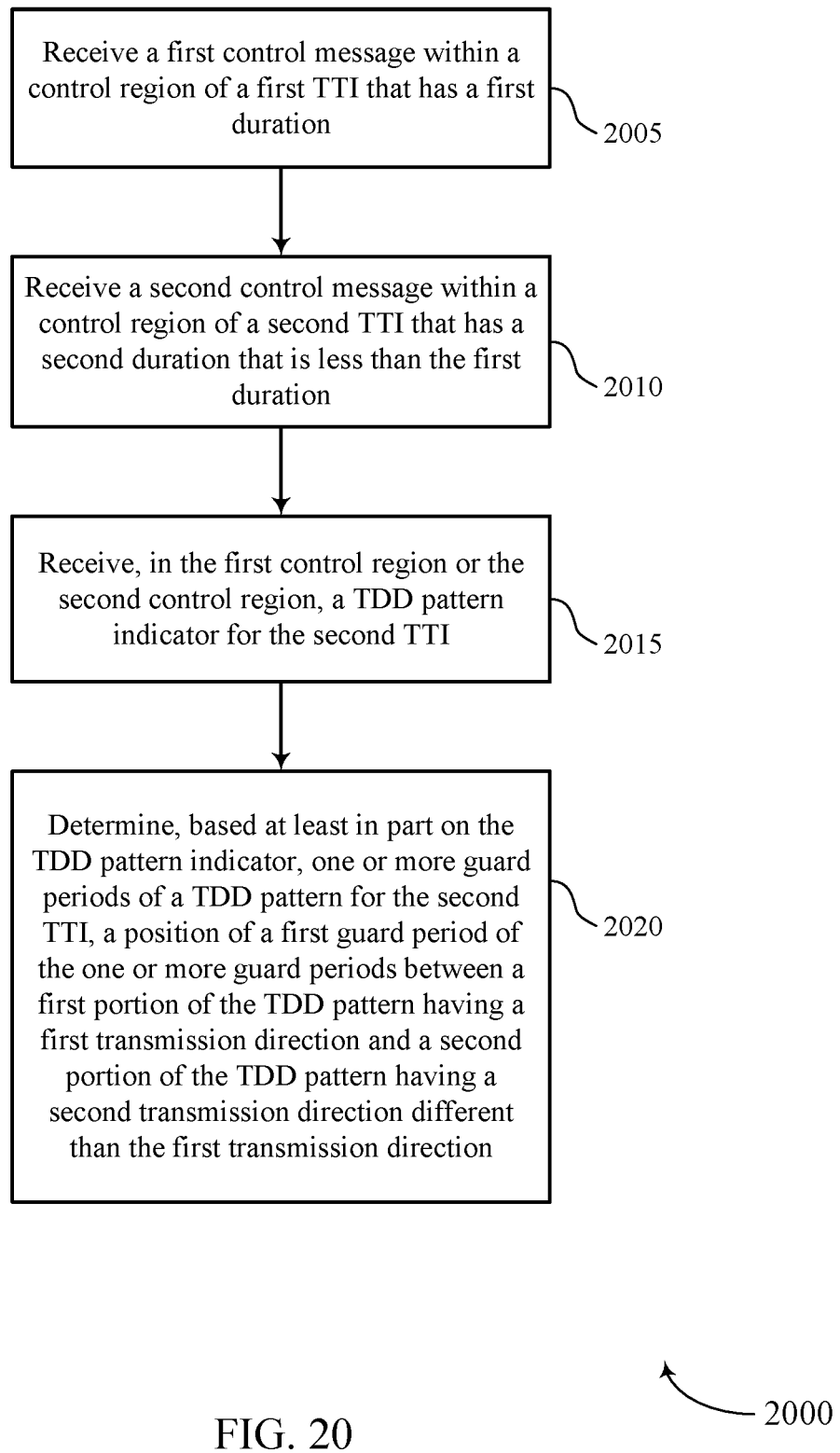

FIG. 20 shows a flowchart illustrating a method 2000 for dynamic TDD in accordance with various aspects of the present disclosure. The operations of method 2000 may be implemented by a UE 115 or its components as described herein. For example, the operations of method 2000 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 2005, the UE 115 may receive a first control message within a first control region of a first TTI that has a first duration. The operations of block 2005 may be performed according to the methods described with reference to FIGS. 1 through 6. In certain examples, aspects of the operations of block 2005 may be performed by a control message component as described with reference to FIGS. 7 through 10.

At block 2010, the UE 115 may receive a second control message within a second control region of a second TTI that has a second duration that is less than the first duration. The operations of block 2010 may be performed according to the methods described with reference to FIGS. 1 through 6. In certain examples, aspects of the operations of block 2010 may be performed by a control message component as described with reference to FIGS. 7 through 10.

At block 2015, the UE 115 may receive, in the first control region or the second control region, a TDD pattern indicator for the second TTI. The operations of block 2015 may be performed according to the methods described with reference to FIGS. 1 through 6. In certain examples, aspects of the operations of block 1515 may be performed by a TDD pattern indicator component as described with reference to FIGS. 7 through 10.

At block 2020, the UE 115 may determine, based at least in part on the TDD pattern indicator, one or more guard periods of a TDD pattern for the second TTI, a position of a first guard period of the one or more guard periods between a first portion of the TDD pattern having a first transmission direction and a second portion of the TDD pattern having a second transmission direction different than the first transmission direction. The operations of block 2020 may be performed according to the methods described with reference to FIGS. 1 through 6. In certain examples, aspects of the operations of block 2020 may be performed by a TDD pattern manager as described with reference to FIGS. 7 through 10.

Figure 21:
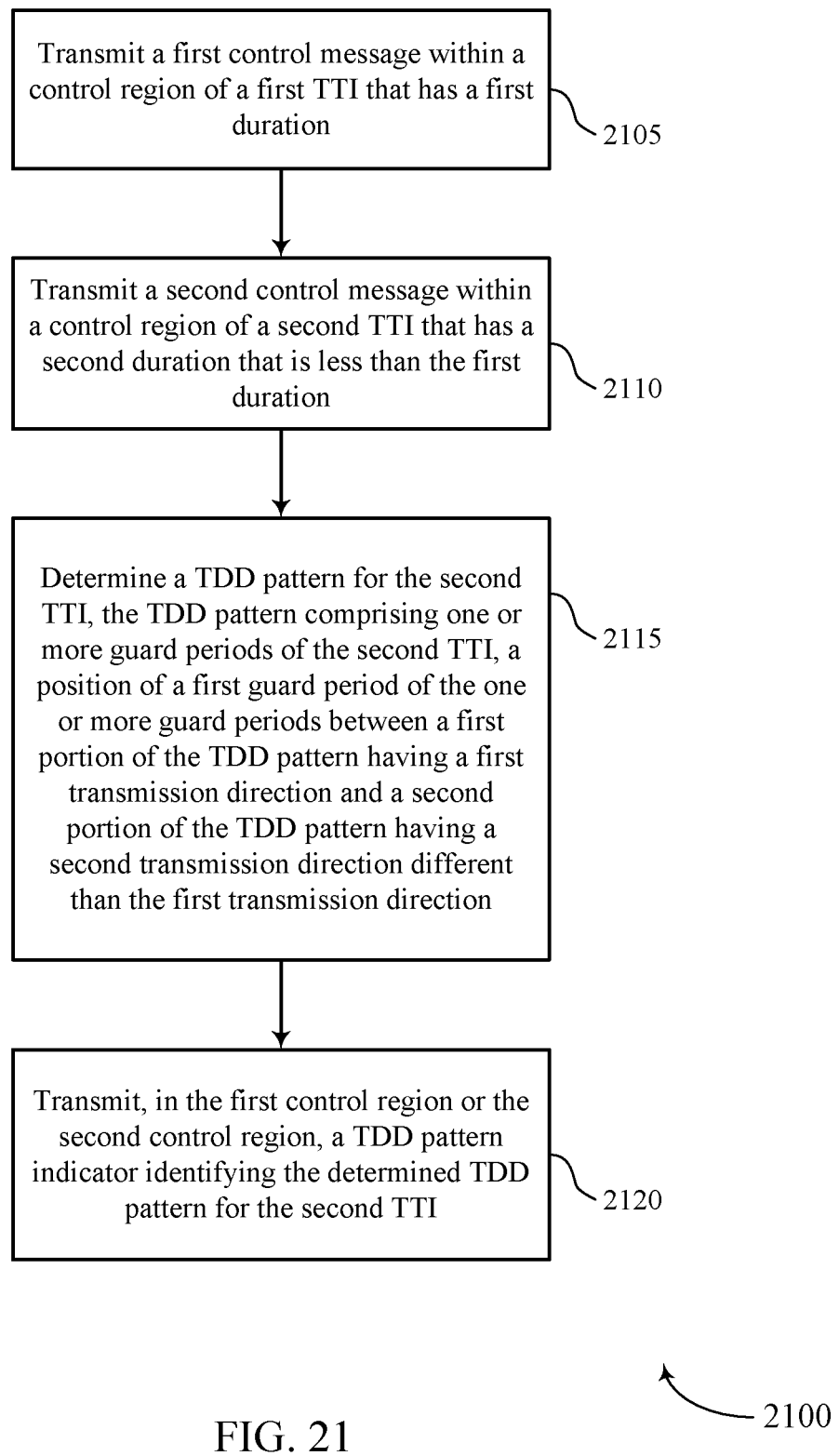

FIG. 21 shows a flowchart illustrating a method 2100 for dynamic TDD in accordance with various aspects of the present disclosure. The operations of method 2100 may be implemented by a base station 105 or its components as described herein. For example, the operations of method 2100 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 2105, the base station 105 may transmit a first control message within a first control region of a first TTI that has a first duration. The operations of block 2105 may be performed according to the methods described with reference to FIGS. 1 through 6. In certain examples, aspects of the operations of block 2105 may be performed by a control message component as described with reference to FIGS. 11 through 14.

At block 2110, the base station 105 may transmit a second control message within a second control region of a second TTI that has a second duration that is less than the first duration. The operations of block 2110 may be performed according to the methods described with reference to FIGS. 1 through 6. In certain examples, aspects of the operations of block 2110 may be performed by a control message component as described with reference to FIGS. 11 through 14.

At block 2115, the base station 105 may determine a TDD pattern for the second TTI. The TDD pattern may include one or more guard periods of the second TTI. The position of a first guard period of the one or more guard periods may between a first portion of the TDD pattern having a first transmission direction and a second portion of the TDD pattern having a second transmission direction different than the first transmission direction. The operations of block 2115 may be performed according to the methods described with reference to FIGS. 1 through 6. In certain examples, aspects of the operations of block 2115 may be performed by a TDD pattern manager as described with reference to FIGS. 11 through 14.

At block 2120, the base station 105 may transmit, in the first control region or the second control region, a TDD pattern indicator identifying the determined TDD pattern for the second TTI. The operations of block 2120 may be performed according to the methods described with reference to FIGS. 1 through 6. In certain examples, aspects of the operations of block 2120 may be performed by a TDD pattern indicator component as described with reference to FIGS. 11 through 14.

Figure 22:
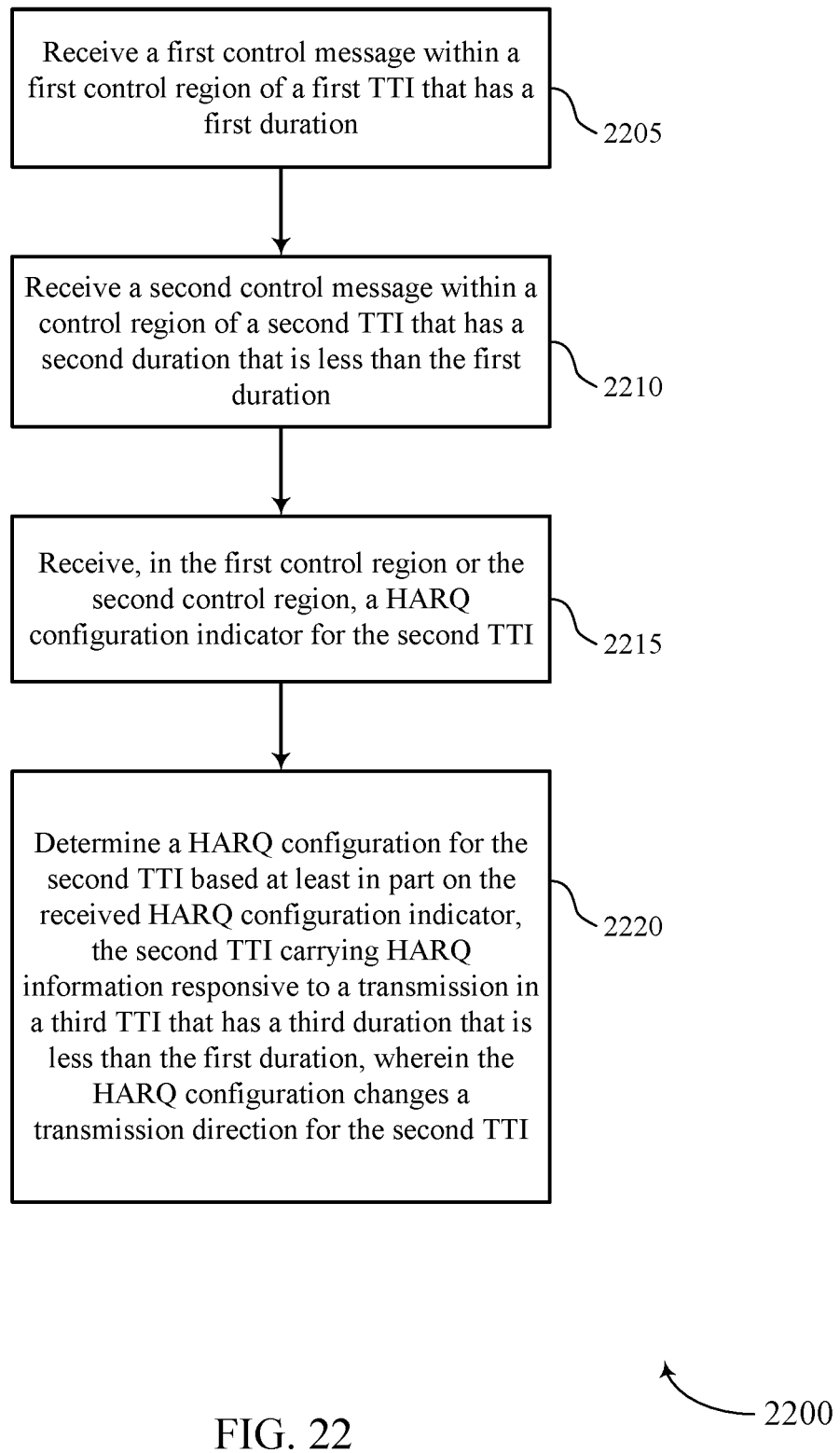

FIG. 22 shows a flowchart illustrating a method 2200 for dynamic TDD in accordance with various aspects of the present disclosure. The operations of method 2200 may be implemented by a UE 115 or its components as described herein. For example, the operations of method 2200 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 2205, the UE 115 may receive a first control message within a first control region of a first TTI that has a first duration. The operations of block 2205 may be performed according to the methods described with reference to FIGS. 1 through 6. In certain examples, aspects of the operations of block 2205 may be performed by a control message component as described with reference to FIGS. 7 through 10.

At block 2210, the UE 115 may receive a second control message within a second control region of a second TTI that has a second duration that is less than the first duration. The operations of block 2210 may be performed according to the methods described with reference to FIGS. 1 through 6. In certain examples, aspects of the operations of block 2210 may be performed by a control message component as described with reference to FIGS. 7 through 10.

At block 2215, the UE 115 may receive, in the first control region or the second control region, a HARQ configuration indicator for the second TTI. The operations of block 2215 may be performed according to the methods described with reference to FIGS. 1 through 6. In certain examples, aspects of the operations of block 2215 may be performed by a TDD pattern indicator component as described with reference to FIGS. 7 through 10.

At block 2220, the UE 115 may determine a HARQ configuration for the second TTI based at least in part on the received HARQ configuration indicator. The second TTI may carry HARQ information responsive to a transmission in a third TTI that has a third duration that is less than the first duration. And the HARQ configuration may change a transmission direction for the second TTI. The operations of block 2220 may be performed according to the methods described with reference to FIGS. 1 through 6. In certain examples, aspects of the operations of block 2220 may be performed by a TDD pattern manager as described with reference to FIGS. 7 through 10.

Figure 23:
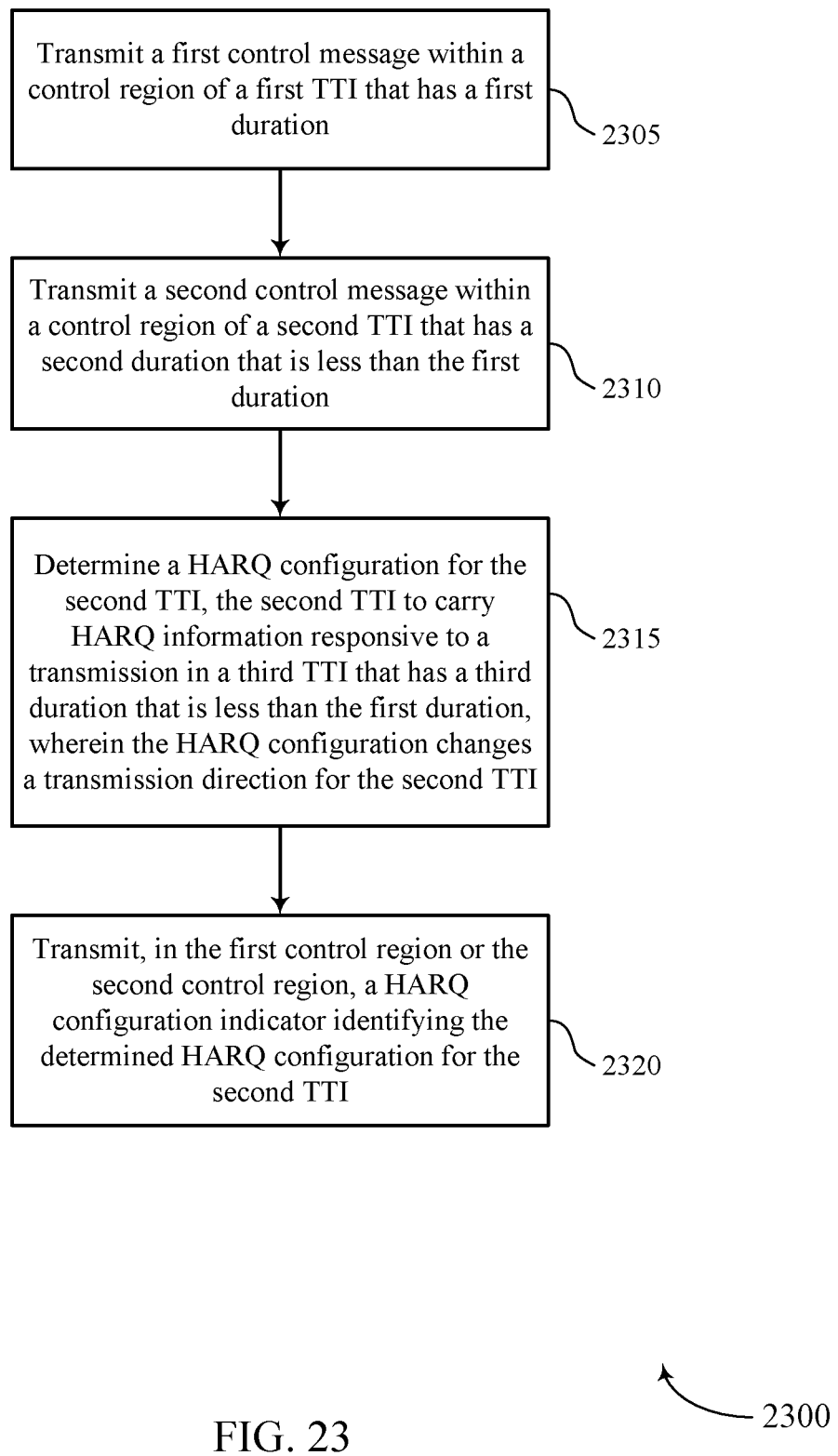

FIG. 23 shows a flowchart illustrating a method 2300 for dynamic TDD in accordance with various aspects of the present disclosure. The operations of method 2300 may be implemented by a base station 105 or its components as described herein. For example, the operations of method 2300 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 2305, the base station 105 may transmit a first control message within a first control region of a first TTI that has a first duration. The operations of block 2305 may be performed according to the methods described with reference to FIGS. 1 through 6. In certain examples, aspects of the operations of block 2305 may be performed by a control message component as described with reference to FIGS. 11 through 14.

At block 2310, the base station 105 may transmit a second control message within a second control region of a second TTI that has a second duration that is less than the first duration. The operations of block 2310 may be performed according to the methods described with reference to FIGS. 1 through 6. In certain examples, aspects of the operations of block 2310 may be performed by a control message component as described with reference to FIGS. 11 through 14.

At block 2315, the base station 105 may determine a HARQ configuration for the second TTI, the second TTI to carry HARQ information responsive to a transmission in a third TTI that has a third duration that is less than the first duration. The HARQ configuration may change a transmission direction for the second TTI. The operations of block 2315 may be performed according to the methods described with reference to FIGS. 1 through 6. In certain examples, aspects of the operations of block 2315 may be performed by a TDD pattern manager as described with reference to FIGS. 11 through 14.

At block 2320, the base station 105 may transmit, in the first control region or the second control region, a HARQ configuration indicator identifying the determined HARQ configuration for the second TTI. The operations of block 2320 may be performed according to the methods described with reference to FIGS. 1 through 6. In certain examples, aspects of the operations of block 2320 may be performed by a TDD pattern indicator component as described with reference to FIGS. 11 through 14.

An apparatus for wireless communication is described. The apparatus may include means for receiving a first control message within a first control region of a first TTI that has a first duration, means for receiving a second control message within a second control region of a second TTI that has a second duration that is less than the first duration, means for receiving, in the first control region or the second control region, a TDD pattern indicator for the second TTI, and means for determining a TDD pattern for the second TTI based at least in part on the received TDD pattern indicator, wherein the TDD pattern changes a transmission direction for the second TTI.

A non-transitory computer readable medium for wireless communication is described. The non-transitory computer-readable medium may include instructions operable to cause a processor to receive a first control message within a first control region of a first TTI that has a first duration, receive a second control message within a second control region of a second TTI that has a second duration that is less than the first duration, receive, in the first control region or the second control region, a TDD pattern indicator for the second TTI, and determine a TDD pattern for the second TTI based at least in part on the received TDD pattern indicator, wherein the TDD pattern changes a transmission direction for the second TTI.

Some examples of the method, apparatus, and non-transitory computer-readable medium described above may further include processes, features, means, or instructions for identifying a default TDD pattern associated with the second TTI, wherein the determined TDD pattern changes the transmission direction for at least a portion of the default TDD pattern.

In some examples of the method, apparatus, and non-transitory computer-readable medium described above, determining the TDD pattern for the second TTI comprises: selecting the TDD pattern from among a plurality of predetermined TDD patterns based at least in part on the received TDD pattern indicator.

In some examples of the method, apparatus, and non-transitory computer-readable medium described above, selecting the TDD pattern from among a plurality of predetermined TDD patterns comprises: reading a table including a plurality of TDD pattern indicator entries associated with respective TDD patterns. Some examples of the method, apparatus, and non-transitory computer-readable medium described above may further include processes, features, means, or instructions for selecting the TDD pattern for the second TTI that may be associated with a TDD pattern indicator entry corresponding to the received TDD pattern indicator.

Some examples of the method, apparatus, and non-transitory computer-readable medium described above may further include processes, features, means, or instructions for identifying that the determined TDD pattern applies to a predetermined number of TTIs, including the second TTI that may have the second duration.

In some examples of the method, apparatus, and non-transitory computer-readable medium described above, the TDD pattern indicator may be included in at least one of a first grant of resources received in the first control message, or a second grant of resources received in the second control message, or a common search space in the first control region of the first TTI, or any combination thereof.

In some examples of the method, apparatus, and non-transitory computer-readable medium described above, the second duration of the second TTI comprises an integer number of symbol periods or one slot.

In some examples of the method, apparatus, and non-transitory computer-readable medium described above, the first TTI and the second TTI at least partially overlap in time.

An apparatus for wireless communication is described. The apparatus may include means for transmitting a first control message within a first control region of a first TTI that has a first duration, means for transmitting a second control message within a second control region of a second TTI that has a second duration that is less than the first duration, means for determining a TDD pattern for the second TTI, wherein the TDD pattern changes a transmission direction for the second TTI, and means for transmitting, in the first control region or the second control region, a TDD pattern indicator identifying the determined TDD pattern for the second TTI.

A non-transitory computer readable medium for wireless communication is described. The non-transitory computer-readable medium may include instructions operable to cause a processor to transmit a first control message within a first control region of a first TTI that has a first duration, transmit a second control message within a second control region of a second TTI that has a second duration that is less than the first duration, determine a TDD pattern for the second TTI, wherein the TDD pattern changes a transmission direction for the second TTI, and transmit, in the first control region or the second control region, a TDD pattern indicator identifying the determined TDD pattern for the second TTI.

Some examples of the method, apparatus, and non-transitory computer-readable medium described above may further include processes, features, means, or instructions for identifying a default TDD pattern associated with the second TTI, wherein the determined TDD pattern changes the transmission direction for at least a portion of the default TDD pattern.

Some examples of the method, apparatus, and non-transitory computer-readable medium described above may further include processes, features, means, or instructions for identifying a transmission direction associated with the first TTI during at least a portion of the second duration. Some examples of the method, apparatus, and non-transitory computer-readable medium described above may further include processes, features, means, or instructions for determining the TDD pattern for the second TTI based at least in part on the identified transmission direction.

Some examples of the method, apparatus, and non-transitory computer-readable medium described above may further include processes, features, means, or instructions for identifying a transmission direction associated with a time interval preceding the second TTI. Some examples of the method, apparatus, and non-transitory computer-readable medium described above may further include processes, features, means, or instructions for determining the TDD pattern for the second TTI based at least in part on the identified transmission direction associated with the time interval preceding the second TTI.

Some examples of the method, apparatus, and non-transitory computer-readable medium described above may further include processes, features, means, or instructions for determining a position and a duration of a guard period for the second TTI based at least in part on the identified transmission direction associated with the time interval adjacent the second TTI.

In some examples of the method, apparatus, and non-transitory computer-readable medium described above, the TDD pattern for the second TTI comprises at least one of downlink resources, or uplink resources, or one or more guard periods, or any combination thereof.

Some examples of the method, apparatus, and non-transitory computer-readable medium described above may further include processes, features, means, or instructions for transmitting the TDD pattern indicator in at least one of a first grant of resources received in the first control message, or a second grant of resources received in the second control message, or a common search space in the first control region of the first TTI, or any combination thereof.

Some examples of the method, apparatus, and non-transitory computer-readable medium described above may further include processes, features, means, or instructions for identifying a conflict between the second TTI and a first reference signal pattern for one or more reference signals associated with the first TTI. Some examples of the method, apparatus, and non-transitory computer-readable medium described above may further include processes, features, means, or instructions for transmitting the one or more reference signals according to a second reference signal pattern. Some examples of the method, apparatus, and non-transitory computer-readable medium described above may further include processes, features, means, or instructions for transmitting an indication of the second reference signal pattern in the first control region.

A method of wireless communication is described. The method may include transmitting a first control message within a first control region of a first TTI that has a first duration, transmitting a second control message within a second control region of a second TTI that has a second duration that is less than the first duration, determining a hybrid automatic repeat request (HARQ) configuration for the second TTI, the second TTI to carry HARQ information responsive to a transmission in a third TTI that has a third duration that is less than the first duration, wherein the HARQ configuration changes a transmission direction for the second TTI, and transmitting, in the first control region or the second control region, a HARQ configuration indicator identifying the determined HARQ configuration for the second TTI.

An apparatus for wireless communication is described. The apparatus may include means for transmitting a first control message within a first control region of a first TTI that has a first duration, means for transmitting a second control message within a second control region of a second TTI that has a second duration that is less than the first duration, means for determining a HARQ configuration for the second TTI, the second TTI to carry HARQ information responsive to a transmission in a third TTI that has a third duration that is less than the first duration, wherein the HARQ configuration changes a transmission direction for the second TTI, and means for transmitting, in the first control region or the second control region, a HARQ configuration indicator identifying the determined HARQ configuration for the second TTI.

Another apparatus for wireless communication is described. The apparatus may include a processor, memory in electronic communication with the processor, and instructions stored in the memory. The instructions may be operable to cause the processor to transmit a first control message within a first control region of a first TTI that has a first duration, transmit a second control message within a second control region of a second TTI that has a second duration that is less than the first duration, determine a HARQ configuration for the second TTI, the second TTI to carry HARQ information responsive to a transmission in a third TTI that has a third duration that is less than the first duration, wherein the HARQ configuration changes a transmission direction for the second TTI, and transmit, in the first control region or the second control region, a HARQ configuration indicator identifying the determined HARQ configuration for the second TTI.

A non-transitory computer readable medium for wireless communication is described. The non-transitory computer-readable medium may include instructions operable to cause a processor to transmit a first control message within a first control region of a first TTI that has a first duration, transmit a second control message within a second control region of a second TTI that has a second duration that is less than the first duration, determine a HARQ configuration for the second TTI, the second TTI to carry HARQ information responsive to a transmission in a third TTI that has a third duration that is less than the first duration, wherein the HARQ configuration changes a transmission direction for the second TTI, and transmit, in the first control region or the second control region, a HARQ configuration indicator identifying the determined HARQ configuration for the second TTI.

In some examples of the method, apparatus, and non-transitory computer-readable medium described above, determining the HARQ configuration for the second TTI comprises identifying a plurality of reference HARQ configurations. Some examples of the method, apparatus, and non-transitory computer-readable medium described above may further include processes, features, means, or instructions for selecting the HARQ configuration from the plurality of reference HARQ configurations.

Some examples of the method, apparatus, and non-transitory computer-readable medium described above may further include processes, features, means, or instructions for identifying a value for a parameter of a channel used to transmit the first control message and the second control message. Some examples of the method, apparatus, and non-transitory computer-readable medium described above may further include processes, features, means, or instructions for selecting the HARQ configuration for the second TTI based at least in part on the identified value for the parameter of the channel.

In some examples of the method, apparatus, and non-transitory computer-readable medium described above, the parameter of the channel comprises a length of the second TTI, or an acknowledgement transmission delay, or a downlink load, or an uplink load, or a combination thereof.

Some examples of the method, apparatus, and non-transitory computer-readable medium described above may further include processes, features, means, or instructions for identifying a HARQ timing offset for the second TTI, the HARQ configuration indicator identifying the HARQ timing offset.

In some examples of the method, apparatus, and non-transitory computer-readable medium described above, identifying the HARQ timing offset comprises identifying a value for a parameter associated with a HARQ procedure. Some examples of the method, apparatus, and non-transitory computer-readable medium described above may further include processes, features, means, or instructions for identifying the HARQ timing offset for the second TTI based at least in part on the identified value for the parameter of the channel.

In some examples of the method, apparatus, and non-transitory computer-readable medium described above, the parameter associated with the HARQ procedure comprises a downlink load, or an uplink load, or an interference pattern, or a downlink processing time, or an uplink processing time, or a combination thereof.

In some examples of the method, apparatus, and non-transitory computer-readable medium described above, transmitting the HARQ configuration indicator comprises transmitting an indication of an entry in an association table, the association table indicating a time relationship between a TTI conveying HARQ information and a TTI to which the TTI conveying HARQ information may be responsive.

A method of wireless communication is described. The method may include receiving a first control message within a first control region of a first TTI that has a first duration, receiving a second control message within a second control region of a second TTI that has a second duration that is less than the first duration, receiving, in the first control region or the second control region, a HARQ configuration indicator for the second TTI, and determining a HARQ configuration for the second TTI based at least in part on the received HARQ configuration indicator, the second TTI carrying HARQ information responsive to a transmission in a third TTI that has a third duration that is less than the first duration, wherein the HARQ configuration changes a transmission direction for the second TTI.

An apparatus for wireless communication is described. The apparatus may include means for receiving a first control message within a first control region of a first TTI that has a first duration, means for receiving a second control message within a second control region of a second TTI that has a second duration that is less than the first duration, means for receiving, in the first control region or the second control region, a HARQ configuration indicator for the second TTI, and means for determining a HARQ configuration for the second TTI based at least in part on the received HARQ configuration indicator, the second TTI carrying HARQ information responsive to a transmission in a third TTI that has a third duration that is less than the first duration, wherein the HARQ configuration changes a transmission direction for the second TTI.

Another apparatus for wireless communication is described. The apparatus may include a processor, memory in electronic communication with the processor, and instructions stored in the memory. The instructions may be operable to cause the processor to receive a first control message within a first control region of a first TTI that has a first duration, receive a second control message within a second control region of a second TTI that has a second duration that is less than the first duration, receive, in the first control region or the second control region, a HARQ configuration indicator for the second TTI, and determine a HARQ configuration for the second TTI based at least in part on the received HARQ configuration indicator, the second TTI carrying HARQ information responsive to a transmission in a third TTI that has a third duration that is less than the first duration, wherein the HARQ configuration changes a transmission direction for the second TTI.

A non-transitory computer readable medium for wireless communication is described. The non-transitory computer-readable medium may include instructions operable to cause a processor to receive a first control message within a first control region of a first TTI that has a first duration, receive a second control message within a second control region of a second TTI that has a second duration that is less than the first duration, receive, in the first control region or the second control region, a HARQ configuration indicator for the second TTI, and determine a HARQ configuration for the second TTI based at least in part on the received HARQ configuration indicator, the second TTI carrying HARQ information responsive to a transmission in a third TTI that has a third duration that is less than the first duration, wherein the HARQ configuration changes a transmission direction for the second TTI.

In some examples of the method, apparatus, and non-transitory computer-readable medium described above, determining the HARQ configuration comprises identifying a plurality of reference HARQ configurations. Some examples of the method, apparatus, and non-transitory computer-readable medium described above may further include processes, features, means, or instructions for selecting the HARQ configuration from the plurality of reference HARQ configurations.

Some examples of the method, apparatus, and non-transitory computer-readable medium described above may further include processes, features, means, or instructions for identifying a value for a parameter of a channel used to receive the first control message and the second control message. Some examples of the method, apparatus, and non-transitory computer-readable medium described above may further include processes, features, means, or instructions for selecting the HARQ configuration for the second TTI based at least in part on the identified value for the parameter of the channel.

In some examples of the method, apparatus, and non-transitory computer-readable medium described above, the parameter of the channel comprises a length of the second TTI, or an acknowledgement transmission delay, or a downlink load, or an uplink load, or a combination thereof.

Some examples of the method, apparatus, and non-transitory computer-readable medium described above may further include processes, features, means, or instructions for identifying a HARQ timing offset for the second TTI, the HARQ configuration indicator identifying the HARQ timing offset.

In some examples of the method, apparatus, and non-transitory computer-readable medium described above, identifying the HARQ timing offset comprises identifying a value for a parameter associated with a HARQ procedure. Some examples of the method, apparatus, and non-transitory computer-readable medium described above may further include processes, features, means, or instructions for identifying the HARQ timing offset for the second TTI based at least in part on the identified value for the parameter of the channel.

In some examples of the method, apparatus, and non-transitory computer-readable medium described above, the parameter associated with the HARQ procedure comprises a downlink load, or an uplink load, or an interference pattern, or a downlink processing time, or an uplink processing time, or a combination thereof.

In some examples of the method, apparatus, and non-transitory computer-readable medium described above, receiving the HARQ configuration indicator comprises receiving an indication of an entry in an association table, the association table indicating a time relationship between a TTI conveying HARQ information and a TTI to which the TTI conveying HARQ information may be responsive.

A method of wireless communication is described. The method may include transmitting a first control message within a first control region of a first TTI that has a first duration, transmitting a second control message within a second control region of a second TTI that has a second duration that is less than the first duration, determining a TDD pattern for the second TTI, the TDD pattern comprising one or more guard periods of the second TTI, a position of a first guard period of the one or more guard periods between a first portion of the TDD pattern having a first transmission direction and a second portion of the TDD pattern having a second transmission direction different than the first transmission direction, and transmitting, in the first control region or the second control region, a TDD pattern indicator identifying the determined TDD pattern for the second TTI.

An apparatus for wireless communication is described. The apparatus may include means for transmitting a first control message within a first control region of a first TTI that has a first duration, means for transmitting a second control message within a second control region of a second TTI that has a second duration that is less than the first duration, means for determining a TDD pattern for the second TTI, the TDD pattern comprising one or more guard periods of the second TTI, a position of a first guard period of the one or more guard periods between a first portion of the TDD pattern having a first transmission direction and a second portion of the TDD pattern having a second transmission direction different than the first transmission direction, and means for transmitting, in the first control region or the second control region, a TDD pattern indicator identifying the determined TDD pattern for the second TTI.

Another apparatus for wireless communication is described. The apparatus may include a processor, memory in electronic communication with the processor, and instructions stored in the memory. The instructions may be operable to cause the processor to transmit a first control message within a first control region of a first TTI that has a first duration, transmit a second control message within a second control region of a second TTI that has a second duration that is less than the first duration, determine a TDD pattern for the second TTI, the TDD pattern comprising one or more guard periods of the second TTI, a position of a first guard period of the one or more guard periods between a first portion of the TDD pattern having a first transmission direction and a second portion of the TDD pattern having a second transmission direction different than the first transmission direction, and transmit, in the first control region or the second control region, a TDD pattern indicator identifying the determined TDD pattern for the second TTI.

A non-transitory computer readable medium for wireless communication is described. The non-transitory computer-readable medium may include instructions operable to cause a processor to transmit a first control message within a first control region of a first TTI that has a first duration, transmit a second control message within a second control region of a second TTI that has a second duration that is less than the first duration, determine a TDD pattern for the second TTI, the TDD pattern comprising one or more guard periods of the second TTI, a position of a first guard period of the one or more guard periods between a first portion of the TDD pattern having a first transmission direction and a second portion of the TDD pattern having a second transmission direction different than the first transmission direction, and transmit, in the first control region or the second control region, a TDD pattern indicator identifying the determined TDD pattern for the second TTI.

Some examples of the method, apparatus, and non-transitory computer-readable medium described above may further include processes, features, means, or instructions for identifying a symbol period of a reference signal for a TDD pattern for the first TTI. Some examples of the method, apparatus, and non-transitory computer-readable medium described above may further include processes, features, means, or instructions for determining the position of the one or more guard periods based at least in part on the identified symbol period of the reference signal.

In some examples of the method, apparatus, and non-transitory computer-readable medium described above, the reference signal comprises a CRS or a DMRS.

Some examples of the method, apparatus, and non-transitory computer-readable medium described above may further include processes, features, means, or instructions for identifying a third transmission direction associated with a third portion of a third TTI, the third TTI following the second TTI. In some examples of the method, apparatus, and non-transitory computer-readable medium described above, the TDD pattern for the second TTI comprises a second guard period of the one or more guard periods, the second guard period positioned at an end of the second TTI between the third portion and the second portion of the TDD pattern having the second transmission direction, the second transmission direction different than the third transmission direction.

Some examples of the method, apparatus, and non-transitory computer-readable medium described above may further include processes, features, means, or instructions for identifying a third transmission direction associated with a third portion of a third TTI, the third TTI preceding the second TTI. In some examples of the method, apparatus, and non-transitory computer-readable medium described above, the TDD pattern for the second TTI comprises a second guard period of the one or more guard periods, the second guard period positioned at a beginning of the second TTI between the third portion and the first portion of the TDD pattern having the first transmission direction, the first transmission direction different than the third transmission direction.

Some examples of the method, apparatus, and non-transitory computer-readable medium described above may further include processes, features, means, or instructions for identifying a boundary of a symbol period of a TDD pattern for the first TTI. Some examples of the method, apparatus, and non-transitory computer-readable medium described above may further include processes, features, means, or instructions for determining the position of a guard period of the one or more guard periods based at least in part on the identified boundary.

In some examples of the method, apparatus, and non-transitory computer-readable medium described above, determining the position of the guard period comprises aligning a boundary of the guard period with the identified boundary of the symbol period.

In some examples of the method, apparatus, and non-transitory computer-readable medium described above, a first boundary of a guard period of the plurality of guard periods may be aligned with a symbol period of a TDD pattern for the first TTI. In some examples of the method, apparatus, and non-transitory computer-readable medium described above, a second boundary of the guard period may be not aligned with a symbol period of a TDD pattern for the first TTI.

In some examples of the method, apparatus, and non-transitory computer-readable medium described above, the second duration comprises an integer number of symbol periods or one slot.

In some examples of the method, apparatus, and non-transitory computer-readable medium described above, a duration of the guard period may be less than a symbol period.

Some examples of the method, apparatus, and non-transitory computer-readable medium described above may further include processes, features, means, or instructions for identifying a transmission type associated with the first TTI. Some examples of the method, apparatus, and non-transitory computer-readable medium described above may further include processes, features, means, or instructions for identifying positions of the one or more guard periods of the TDD pattern within the second TTI based at least in part on the identified transmission direction associated with the first TTI.

In some examples of the method, apparatus, and non-transitory computer-readable medium described above, the identified transmission type associated with the first TTI may be an uplink transmission, or a downlink transmission, or a multicast broadcast single-frequency network (MBSFN) transmission.

Some examples of the method, apparatus, and non-transitory computer-readable medium described above may further include processes, features, means, or instructions for identifying a slot index associated with the first TTI. Some examples of the method, apparatus, and non-transitory computer-readable medium described above may further include processes, features, means, or instructions for identifying positions of the one or more guard periods of the TDD pattern based at least in part on the slot index associated with the first TTI.

A method of wireless communication is described. The method may include receiving a first control message within a first control region of a first TTI that has a first duration, receiving a second control message within a second control region of a second TTI that has a second duration that is less than the first duration, receiving, in the first control region or the second control region, a TDD pattern indicator for the second TTI, and determining, based at least in part on the TDD pattern indicator, one or more guard periods of a TDD pattern for the second TTI, a position of a first guard period of the one or more guard periods between a first portion of the TDD pattern having a first transmission direction and a second portion of the TDD pattern having a second transmission direction different than the first transmission direction.

An apparatus for wireless communication is described. The apparatus may include means for receiving a first control message within a first control region of a first TTI that has a first duration, means for receiving a second control message within a second control region of a second TTI that has a second duration that is less than the first duration, means for receiving, in the first control region or the second control region, a TDD pattern indicator for the second TTI, and means for determining, based at least in part on the TDD pattern indicator, one or more guard periods of a TDD pattern for the second TTI, a position of a first guard period of the one or more guard periods between a first portion of the TDD pattern having a first transmission direction and a second portion of the TDD pattern having a second transmission direction different than the first transmission direction.

Another apparatus for wireless communication is described. The apparatus may include a processor, memory in electronic communication with the processor, and instructions stored in the memory. The instructions may be operable to cause the processor to receive a first control message within a first control region of a first TTI that has a first duration, receive a second control message within a second control region of a second TTI that has a second duration that is less than the first duration, receive, in the first control region or the second control region, a TDD pattern indicator for the second TTI, and determine, based at least in part on the TDD pattern indicator, one or more guard periods of a TDD pattern for the second TTI, a position of a first guard period of the one or more guard periods between a first portion of the TDD pattern having a first transmission direction and a second portion of the TDD pattern having a second transmission direction different than the first transmission direction.

A non-transitory computer readable medium for wireless communication is described. The non-transitory computer-readable medium may include instructions operable to cause a processor to receive a first control message within a first control region of a first TTI that has a first duration, receive a second control message within a second control region of a second TTI that has a second duration that is less than the first duration, receive, in the first control region or the second control region, a TDD pattern indicator for the second TTI, and determine, based at least in part on the TDD pattern indicator, one or more guard periods of a TDD pattern for the second TTI, a position of a first guard period of the one or more guard periods between a first portion of the TDD pattern having a first transmission direction and a second portion of the TDD pattern having a second transmission direction different than the first transmission direction.

Some examples of the method, apparatus, and non-transitory computer-readable medium described above may further include processes, features, means, or instructions for identifying a reference signal for a TDD pattern for the first TTI. Some examples of the method, apparatus, and non-transitory computer-readable medium described above may further include processes, features, means, or instructions for determining to skip monitoring a symbol period during the second TTI associated with the identified reference signal.

It should be noted that the methods described above describe possible implementations, and that the operations and the steps may be rearranged or otherwise modified and that other implementations are possible. Furthermore, aspects from two or more of the methods may be combined.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

What is claimed is:

1. A method for wireless communication, comprising:
   receiving a first control message within a first control region of a first transmission time interval (TTI) that has a first duration;
   receiving a second control message within a second control region of a second TTI that has a second duration that is less than the first duration;
   receiving, in the first control region or the second control region, a time division duplex (TDD) pattern indicator for the second TTI; and
   determining a TDD pattern for the second TTI based at least in part on the received TDD pattern indicator, wherein the TDD pattern changes a transmission direction for at least a portion of the second TTI to uplink, to downlink, or both.

2. The method of claim 1, further comprising:
   identifying a default TDD pattern associated with the second TTI, wherein the determined TDD pattern changes the transmission direction for at least a portion of the default TDD pattern.

3. The method of claim 1, wherein determining the TDD pattern for the second TTI comprises:
selecting the TDD pattern from among a plurality of predetermined TDD patterns based at least in part on the received TDD pattern indicator.

4. The method of claim 3, wherein selecting the TDD pattern from among the plurality of predetermined TDD patterns comprises:
reading a table including a plurality of TDD pattern indicator entries associated with respective TDD patterns; and
selecting the TDD pattern for the second TTI that is associated with a TDD pattern indicator entry corresponding to the received TDD pattern indicator.

5. The method of claim 1, further comprising:
identifying that the determined TDD pattern applies to a predetermined number of TTIs, including the second TTI that has the second duration.

6. The method of claim 1, wherein the TDD pattern indicator is included in at least one of a first grant of resources received in the first control message, or a second grant of resources received in the second control message, or a common search space in the first control region of the first TTI, or any combination thereof.

7. The method of claim 1, wherein the second duration of the second TTI comprises an integer number of symbol periods or one slot.

8. The method of claim 1, wherein the first TTI and the second TTI at least partially overlap in time.

9. A method for wireless communication, comprising:
transmitting a first control message within a first control region of a first transmission time interval (TTI) that has a first duration;
transmitting a second control message within a second control region of a second TTI that has a second duration that is less than the first duration;
determining a time division duplex (TDD) pattern for the second TTI, wherein the TDD pattern changes a transmission direction for at least a portion of the second TTI to uplink, to downlink, or both; and
transmitting, in the first control region or the second control region, a TDD pattern indicator identifying the determined TDD pattern for the second TTI.

10. The method of claim 9, further comprising:
identifying a default TDD pattern associated with the second TTI, wherein the determined TDD pattern changes the transmission direction for at least a portion of the default TDD pattern.

11. The method of claim 9, further comprising:
identifying a transmission direction associated with the first TTI during at least a portion of the second duration; and
determining the TDD pattern for the second TTI based at least in part on the identified transmission direction.

12. The method of claim 9, further comprising:
identifying a transmission direction associated with a time interval preceding the second TTI; and
determining the TDD pattern for the second TTI based at least in part on the identified transmission direction associated with the time interval preceding the second TTI.

13. The method of claim 12, further comprising:
determining a position and a duration of a guard period for the second TTI based at least in part on the identified transmission direction associated with the time interval adjacent the second TTI.

14. The method of claim 9, wherein the TDD pattern for the second TTI comprises at least one of downlink resources, or uplink resources, or one or more guard periods, or any combination thereof.

15. The method of claim 9, further comprising:
transmitting the TDD pattern indicator in at least one of a first grant of resources received in the first control message, or a second grant of resources received in the second control message, or a common search space in the first control region of the first TTI, or any combination thereof.

16. The method of claim 9, further comprising:
identifying a conflict between the second TTI and a first reference signal pattern for one or more reference signals associated with the first TTI;
transmitting the one or more reference signals according to a second reference signal pattern; and
transmitting an indication of the second reference signal pattern in the first control region.

17. An apparatus for wireless communication, in a system comprising: a processor; memory in electronic communication with the processor; and instructions stored in the memory and operable, when executed by the processor, to cause the apparatus to:
receive a first control message within a first control region of a first transmission time interval (TTI) that has a first duration;
receive a second control message within a second control region of a second TTI that has a second duration that is less than the first duration;
receive, in the first control region or the second control region, a time division duplex (TDD) pattern indicator for the second TTI; and
determine a TDD pattern for the second TTI based at least in part on the received TDD pattern indicator, wherein the TDD pattern changes a transmission direction for at least a portion of the second TTI to uplink, to downlink, or both.

18. The apparatus of claim 17, wherein the instructions are further executable by the processor to cause the apparatus to:
identify a default TDD pattern associated with the second TTI, wherein the determined TDD pattern changes the transmission direction for at least a portion of the default TDD pattern.

19. The apparatus of claim 17, wherein the instructions executable by the processor to cause the apparatus to determine the TDD pattern for the second TTI comprise instructions executable by the processor to cause the apparatus to:
select the TDD pattern from among a plurality of predetermined TDD patterns based at least in part on the received TDD pattern indicator.

20. The apparatus of claim 19, wherein the instructions executable by the processor to cause the apparatus to select the TDD pattern from among a plurality of predetermined TDD patterns comprise instructions executable by the processor to cause the apparatus to:
read a table including a plurality of TDD pattern indicator entries associated with respective TDD patterns; and
select the TDD pattern for the second TTI that is associated with a TDD pattern indicator entry corresponding to the received TDD pattern indicator.

21. The apparatus of claim 17, wherein the instructions are further executable by the processor to cause the apparatus to:
identify that the determined TDD pattern applies to a predetermined number of TTIs, including the second TTI that has the second duration.

22. The apparatus of claim 17, wherein the TDD pattern indicator is included in at least one of a first grant of resources received in the first control message, or a second grant of resources received in the second control message, or a common search space in the first control region of the first TTI, or any combination thereof.

23. An apparatus for wireless communication, in a system comprising: a processor; memory in electronic communication with the processor; and instructions stored in the memory and operable, when executed by the processor, to cause the apparatus to:
transmit a first control message within a first control region of a first transmission time interval (TTI) that has a first duration;
transmit a second control message within a second control region of a second TTI that has a second duration that is less than the first duration;
determine a time division duplex (TDD) pattern for the second TTI, wherein the TDD pattern changes a transmission direction for at least a portion of the second TTI to uplink, to downlink, or both; and
transmit, in the first control region or the second control region, a TDD pattern indicator identifying the determined TDD pattern for the second TTI.

24. The apparatus of claim 23, wherein the instructions are further executable by the processor to cause the apparatus to:
identify a default TDD pattern associated with the second TTI, wherein the determined TDD pattern changes the transmission direction for at least a portion of the default TDD pattern.

25. The apparatus of claim 23, wherein the instructions are further executable by the processor to cause the apparatus to:
identify a transmission direction associated with the first TTI during at least a portion of the second duration; and
determine the TDD pattern for the second TTI based at least in part on the identified transmission direction.

26. The apparatus of claim 23, wherein the instructions are further executable by the processor to cause the apparatus to:
identify a transmission direction associated with a time interval preceding the second TTI; and
determine the TDD pattern for the second TTI based at least in part on the identified transmission direction associated with the time interval preceding the second TTI.

27. The apparatus of claim 26, wherein the instructions are further executable by the processor to cause the apparatus to:
determine a position and a duration of a guard period for the second TTI based at least in part on the identified transmission direction associated with the time interval adjacent the second TTI.

28. The apparatus of claim 23, wherein the TDD pattern for the second TTI comprises at least one of downlink resources, or uplink resources, or one or more guard periods, or any combination thereof.

29. The apparatus of claim 23, wherein the instructions are further executable by the processor to cause the apparatus to:
transmit the TDD pattern indicator in at least one of a first grant of resources received in the first control message, or a second grant of resources received in the second control message, or a common search space in the first control region of the first TTI, or any combination thereof.

30. The apparatus of claim 23, wherein the instructions are further executable by the processor to cause the apparatus to:
identify a conflict between the second TTI and a first reference signal pattern for one or more reference signals associated with the first TTI;
transmit the one or more reference signals according to a second reference signal pattern; and
transmit an indication of the second reference signal pattern in the first control region.

* * * * *